(12) United States Patent
Akiyama

(10) Patent No.: US 7,889,400 B2
(45) Date of Patent: Feb. 15, 2011

(54) IMAGE READING APPARATUS FOR DETERMINING A SETBACK DISTANCE AFTER READING INTERRUPTION

(75) Inventor: Shigeki Akiyama, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 620 days.

(21) Appl. No.: 11/940,006

(22) Filed: Nov. 14, 2007

(65) Prior Publication Data

US 2008/0117481 A1 May 22, 2008

(30) Foreign Application Priority Data

Nov. 16, 2006 (JP) ............................. 2006-310362

(51) Int. Cl.
*H04N 1/04* (2006.01)
(52) U.S. Cl. ...................................... 358/496; 358/497
(58) Field of Classification Search ................. 358/496, 358/497, 498, 404, 437
See application file for complete search history.

(56) References Cited

U.S. PATENT DOCUMENTS 5,341,225 A * 8/1994 Stein et al. .................. 358/498
2004/0036011 A1 * 2/2004 Jones ....................... 250/208.1

FOREIGN PATENT DOCUMENTS

| JP | H05-183699 A | 7/1993 |
|---|---|---|
| JP | 2001-024859 A | 1/2001 |

* cited by examiner

*Primary Examiner*—Thomas D Lee
(74) *Attorney, Agent, or Firm*—Baker Botts L.L.P.

(57) ABSTRACT

An image reading apparatus includes a driving source, a conveying mechanism, a reading control unit, an acceleration distance measuring unit, an interruption determination unit, a stop control unit, a deceleration distance measuring unit, a setback control unit, and a setback distance setting unit. The acceleration distance measuring unit measures an acceleration distance from a moving start position of a conveyed object to a position where the conveyed object has been shifted to the constant-velocity moving state. The deceleration distance measuring unit measures a deceleration distance from a position of the conveyed object when operation of the reading control unit has been stopped to a position where move of the conveyed object in a conveyance direction has been stopped. The setback distance setting unit sets a setback distance to move the conveyed object by the setback control unit based on the acceleration distance and the deceleration distance.

15 Claims, 26 Drawing Sheets

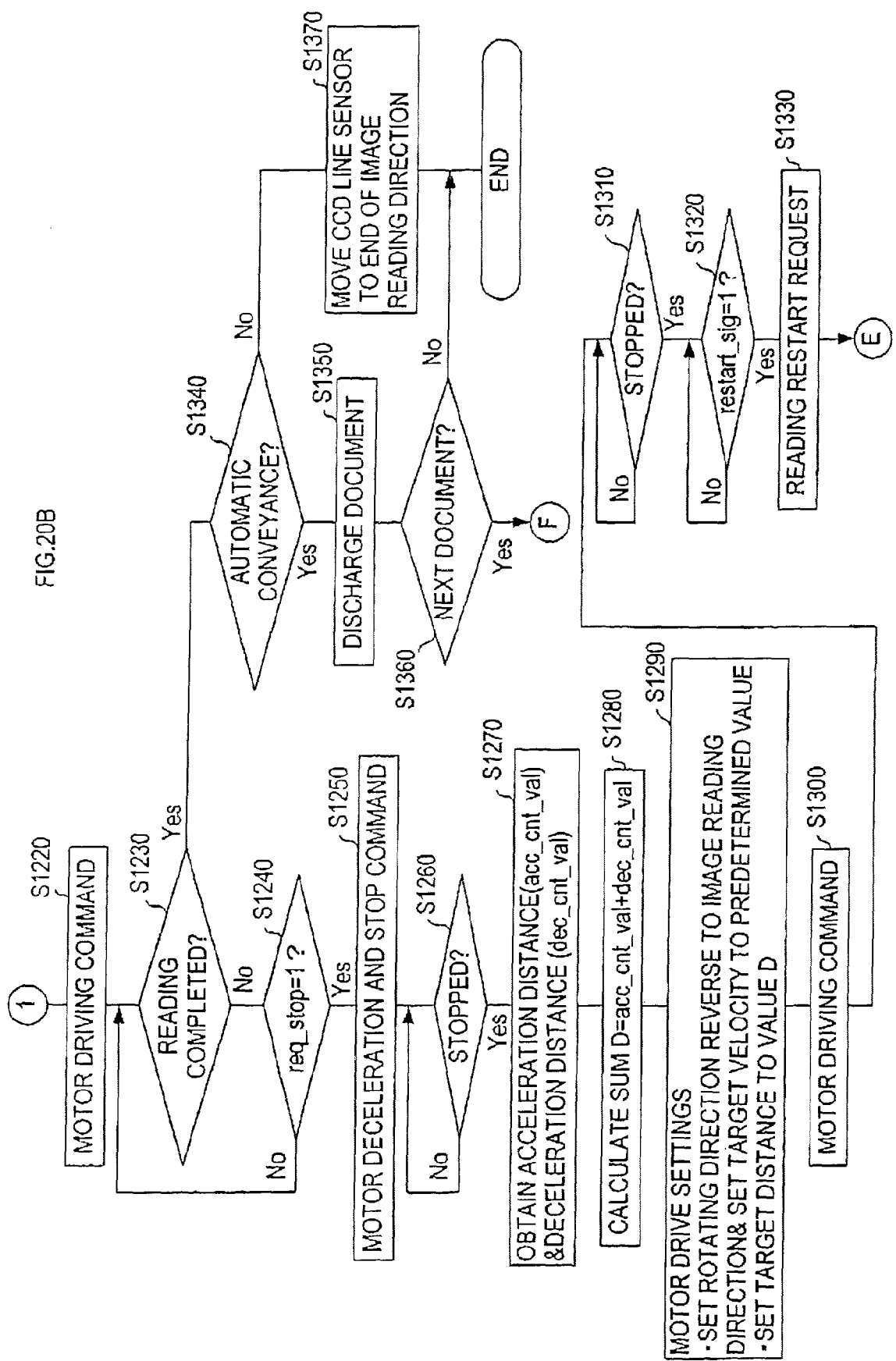

IMAGE READING APPARATUS FOR DETERMINING A SETBACK DISTANCE AFTER READING INTERRUPTION

CROSS-REFERENCE TO RELATED APPLICATIONS

This application claims the benefit of Japanese Patent Application No. 2006-310362 filed Nov. 16, 2006 in the Japan Patent Office, the disclosure of which is incorporated herein by reference.

BACKGROUND

This invention relates to an image reading apparatus that reads image information from a read object.

Conventional image reading apparatus are known to be of a flatbed type or of an ADF (Auto Document Feeder) type. A flatbed type image reading apparatus conveys a reading unit under a read object (document) in static condition, thereby to make the reading unit read image information of the read object. An ADF type image reading apparatus conveys a read object (document) over a reading unit in fixed condition, thereby to make the reading unit read image information of the read object.

Known driving sources for conveying the reading unit and the read object are a pulse motor and a DC motor. A pulse motor is widely used because of simplicity of position control and convenience in constitution of a control system. However, a pulse motor produces large noise and consumes more power than a DC motor while driven. Furthermore, a pulse motor is inferior to a DC motor in velocity of scanning. Therefore, for the purpose of reducing noise and power consumption while driven, as well as improving velocity performance, an image reading apparatus adopting a DC motor as a driving source is actively developed in recent years.

SUMMARY

In recent image reading apparatus having high reading resolution, there are cases in which data transfer rate to external apparatus and image processing rate after reading such as gamma correction are slow to image reading velocity. In these cases, a buffer for storing image data outputted from the reading unit may be filled up before completing image reading operation for one sheet of document. Thus, in a conventional image reading apparatus, reading operation is temporarily stopped when free space on the buffer becomes less than a threshold. Once a certain level of free space is secured on the buffer, reading operation is resumed.

In a known image reading apparatus, when reading is interrupted thereby to temporarily stop conveyance of the reading unit or the read object, the conveyed object (reading unit or read object) is set back a predetermined distance from a reading interruption point. Conveyance of the conveyed object is resumed from the position short of the reading interruption point. The reason why the conveyance of the conveyed object is resumed from the position short of the reading interruption point is because it is necessary to move the conveyed object at a constant velocity in a reading section in order not to cause distortion or irregular density in a read image. In order to move the conveyed object at a constant velocity, an acceleration section is necessary.

In the conventional image reading apparatus, the conveyed object is only set back a predetermined distance from the reading interruption point. The conveyed object is then reconveyed from the predetermined distance short of the reading interruption point. Therefore, it is necessary to set a needlessly long setback distance (i.e., the aforementioned predetermined distance) in consideration of deterioration with age in transfer characteristics of a conveying mechanism. There is a problem that it takes long for document reading if there are many interruptions in reading.

Especially, a DC motor used as a driving source is more susceptible to deterioration with age in transfer characteristics than a pulse motor. Therefore, it is necessary to set the setback distance sufficiently long.

It would be desirable to provide an image reading apparatus that allows more appropriate setting of a setback distance of a conveyed object than before at interruption of reading of image information. It would be also desirable that the image reading apparatus can efficiently resume reading.

In one aspect of the present invention, an image reading apparatus may include a driving source, a conveying mechanism, a reading control unit, an acceleration distance measuring unit, an interruption determination unit, a stop control unit, a deceleration distance measuring unit, a setback control unit, and a setback distance setting unit.

The driving source generates a driving force. The conveying mechanism transmits the driving force generated by the driving source to a conveyed object so as to convey the conveyed object along a predetermined conveyance path to read image information from a read object.

The reading control unit includes a constant velocity moving control portion and a writing portion. The constant velocity moving control portion controls a moving velocity of the conveyed object through the conveying mechanism to move the conveyed object at a constant velocity in a conveying direction along the conveyance path. The writing portion writes, into a memory area, image data of each line on the read object generated by reading the image information when the conveyed object passes a corresponding position on the conveyance path corresponding to a reading start position on the read object where reading of the image information should be started.

The acceleration distance measuring unit measures an acceleration distance from the moving start position to a position where the conveyed object has been shifted to the constant-velocity moving state.

The interruption determination unit determines whether or not to interrupt operation of the reading control unit.

The stop control unit, when the interruption determination unit determines to interrupt the operation of the reading control unit, stops the operation of the reading control unit, and decelerates the conveyed object through the conveying mechanism until the conveyed object stops moving in the conveyance direction.

The deceleration distance measuring unit measures a deceleration distance from a position of the conveyed object when the operation of the reading control unit has been stopped to a position where move of the conveyed object in the conveyance direction has been stopped.

The setback control unit moves the conveyed object, which has stopped moving in the conveyance direction, in a direction opposite to the conveyance direction through the conveying mechanism.

The setback distance setting unit sets a setback distance to move the conveyed object by the setback control unit based on the acceleration distance measured by the acceleration distance measuring unit and the deceleration distance measured by the deceleration distance measuring unit.

In this manner, the image reading apparatus in one aspect of the present invention measures the acceleration distance and the deceleration distance. Based on the measurement results, the setback distance of the conveyed object is determined at interruption of reading.

In order to resume reading from the reading interruption point at restart of reading, it is necessary for the conveyed object to be shifted into a constant-velocity moving state before passing the reading interruption point (reading resumption point). The required setback distance can be theoretically calculated based on the acceleration distance and the deceleration distance.

Accordingly, if the setback distance is determined based on actual measurements of the acceleration distance and the deceleration distance as in the present invention, it is not necessary to preset a needlessly long setback distance in consideration of deterioration with age in transfer characteristics of the conveying mechanism as in the conventional apparatus having a fixed setback distance. The conveyed object can be set back by an appropriate distance at interruption of reading.

Accordingly, the image reading apparatus of the present invention can inhibit prolongation of time required for conveying the conveyed object to the reading resumption point at restart of reading, and also inhibit unnecessary increase in power consumption for conveyance to the reading resumption point, due to needlessly long setback distance of the conveyed object. That is, the image reading apparatus allows efficient performance of reading restart operation.

BRIEF DESCRIPTION OF THE DRAWINGS

The invention will now be described below, by way of example, with reference to the accompanying drawings, in which:

FIG. 20B is a flowchart showing a second half of the reading control process;

DETAILED DESCRIPTION OF THE PREFERRED EMBODIMENT (1) Overall Constitution of Multifunction Apparatus FIG. 1 is a block diagram showing an overall constitution (electrical constitution) of a multifunction apparatus 1 according to the present invention. The multifunction apparatus 1 of the present embodiment has a printer function, a copier function, a scanner function and a facsimile function. The multifunction apparatus 1 includes a CPU 11, a ROM 12, and a RAM 13. The CPU 11 integratedly controls the entire multifunction apparatus 1. The ROM 12 stores various programs executed by the CPU 11, data, etc. The RAM 13 is used as a work area during operation of the CPU 11.

Figure 1:
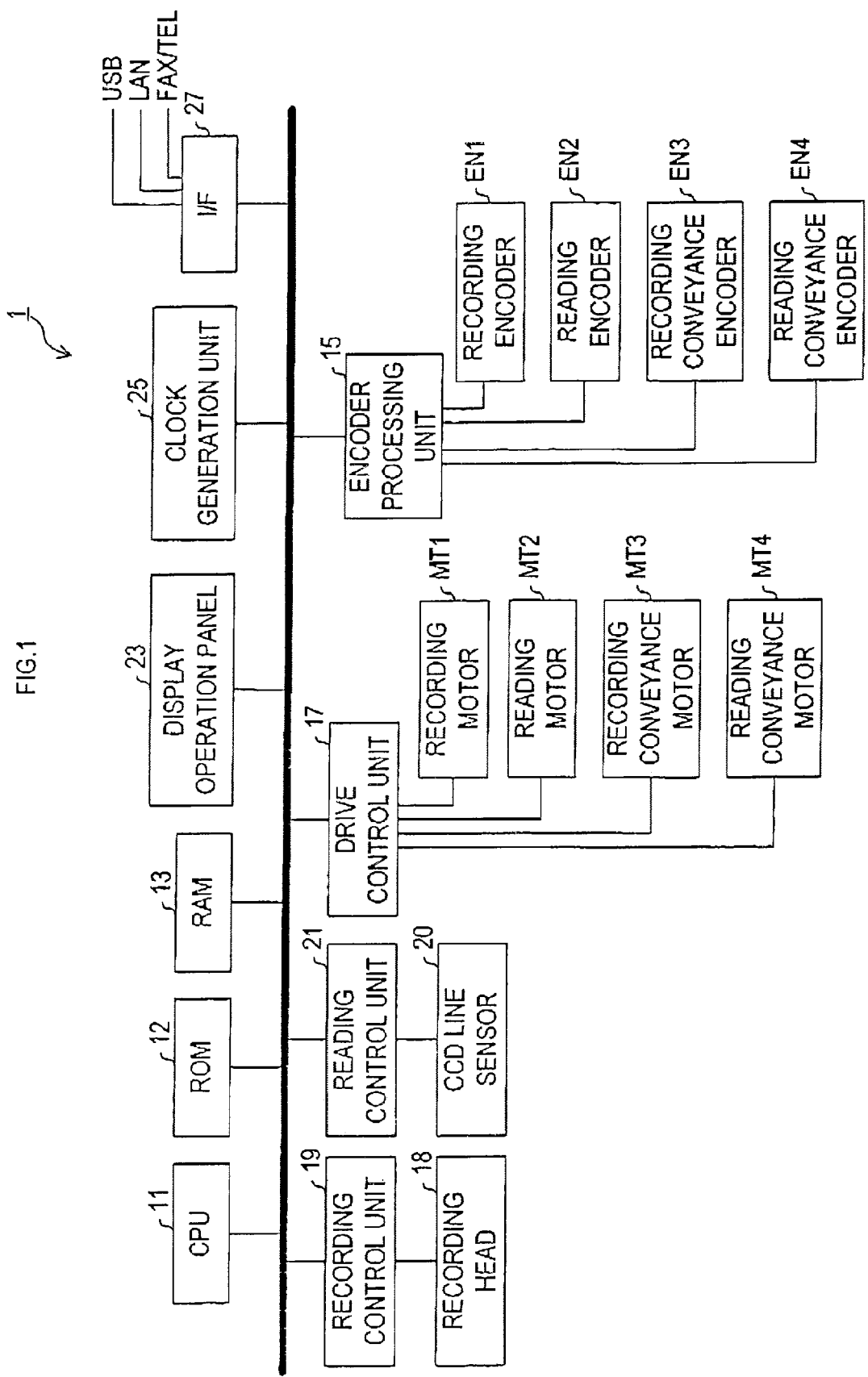
FIG. 1 is a block diagram showing a constitution of a multifunction apparatus according to an embodiment.

The multifunction apparatus 1 includes an encoder processing unit 15, a drive control unit 17, a recording control unit 19, a reading control unit 21, a display operation panel 23, a clock generation unit 25 and an external interface 27.

The encoder processing unit 15 performs processing in accordance with pulse signals from encoders EN1, EN2, EN3 and EN4. The drive control unit 17 controls motors MT1, MT2, MT3 and MT4. The recording control unit 19 controls image formation by a recording head 18. The reading control unit 21 controls image reading by a CCD line sensor 20. The display operation panel 23 includes a display for displaying information and operation keys for receiving user operation. The clock generation unit 25 generates a clock signal having a substantially shorter cycle than the pulse signals outputted from the encoders EN1 to EN4 as well as a line start signal outputted from a later explained reading front end 41. The clock generation unit 25 also provides the generated clock signal to respective components in the multifunction apparatus 1.

The external interface 27 includes various interfaces, such as for a USB, a LAN, a FAX and a TEL (voice call). The multifunction apparatus 1 communicates with various external apparatus through the external interface 27.

The recording head 18 performs scanning in a main scanning direction by a torque of a recording motor MT1. The recording head 18 ejects ink during the scanning to form an image on a recording paper facing to the recording head 18 in an ejecting direction. Specifically, the multifunction apparatus 1 of the present embodiment controls the recording motor MT1 through the drive control unit 17 thereby to move the recording head 18 in the main scanning direction. The multifunction apparatus 1 also controls the recording head 18 through the recording control unit 19 thereby to print an image based on image data to be printed on the recording paper.

As a result of continuous printing of line images on the recording paper in the above described manner during conveyance of the recording paper in a sub scanning direction, an entire image is formed on the recording paper. Conveyance of the recording paper in the sub scanning direction during image formation is achieved by the drive control unit 17 controlling a recording conveyance motor MT3 provided for rotation of a not shown recording paper conveyance roller which holds the recording paper.

In the present embodiment, a recording encoder (rotary encoder) EN1 is provided to a rotating shaft of the recording motor MT1. The recording encoder EN1 generates a pulse signal each time the rotating shaft of the recording motor MT1 rotates by a predetermined angle. Also, a recording conveyance encoder (rotary encoder) EN3 is provided to a rotating shaft of the recording conveyance motor MT3. The recording conveyance encoder EN3 generates a pulse signal each time the rotating shaft of the recording motor MT3 rotates by a predetermined angle.

The multifunction apparatus 1 is configured such that when the rotating shaft of the recording motor MT1 rotates by a predetermined angle, the recording head 18 is moved by a predetermined distance in the main scanning direction, while when the rotating shaft of the recording conveyance motor MT3 rotates by a predetermined angle, the recording paper is moved by a predetermined distance in the sub scanning direction.

That is, the multifunction apparatus 1 controls scanning by the recording head 18 and conveyance of the recording paper in accordance with information, which is derived from the encoder processing unit 16 based on the pulse signals outputted from the encoders EN1 and EN3 and indicates conveyance positions of the recording head 18 and the recording paper, to form an entire image on the recording paper.

The above described function of forming an image on a recording paper is used in the present embodiment for achieving the printer function, the copier function and the facsimile function.

Figure 6:
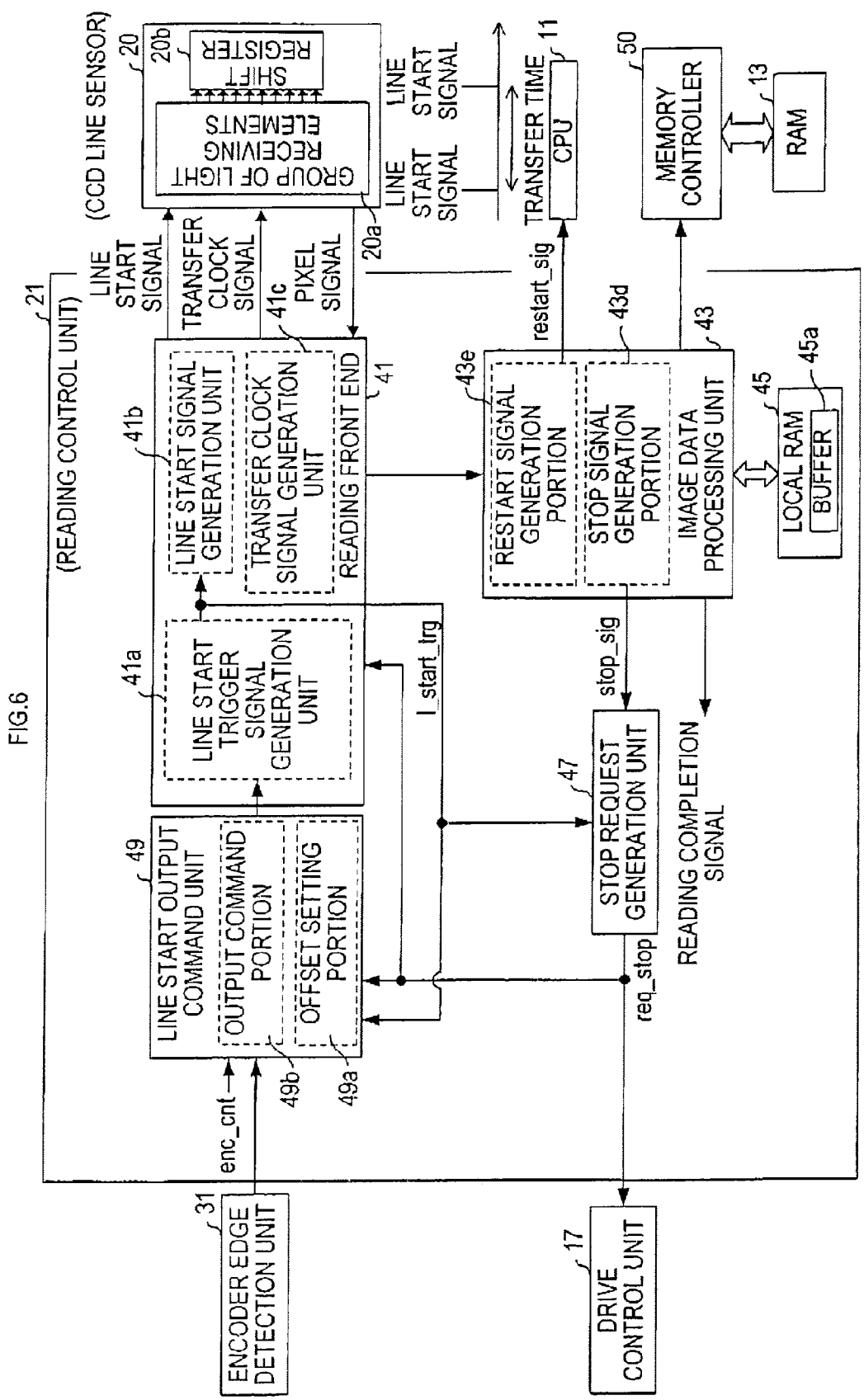
FIG. 6 is a block diagram showing a constitution of a reading control unit of the multifunction apparatus.

The CCD line sensor 20 in the present embodiment includes a group of light receiving elements (photo diodes) 20a arranged in a line and a CCD analog shift register 20b (see FIG. 6). The CCD line sensor 20 controlled by the reading control unit 21 supplies electric charges generated by the light receiving elements as pixel information to the CCD analog shift register 20b per each supply of a line start signal. Subsequently, the CCD line sensor 20 sequentially outputs pixel signals in accordance with transfer clock signals from an output end of the CCD analog shift register 20b during a time period before supply of a next line start signal.

The reading control unit 21 controls the CCD line sensor 20 so as to read image information of a read object which faces the CCD line sensor 20. The reading control unit 21 also converts the pixel signals as a read result outputted from the CCD line sensor 20 into digital pixel data. The reading control unit 21 further arranges the pixel data to generate line image data, and writes the line image data in the RAM 13.

Figure 2:
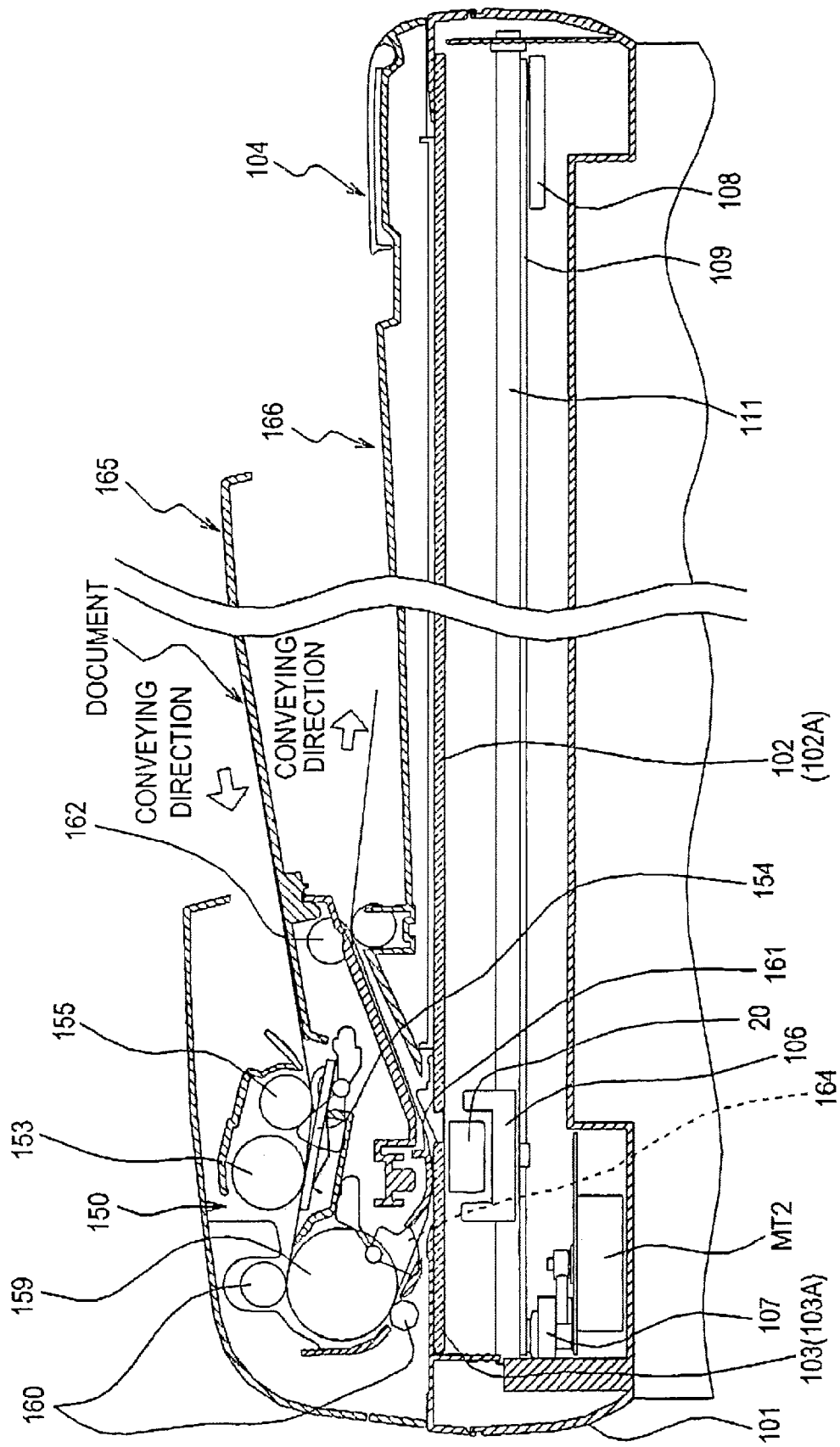
FIG. 2 is a cross-sectional view showing a schematic constitution of a scanner unit and an ADF device of the multifunction apparatus.

As shown in FIG. 2, when an automatic conveyance and reading function is activated in the multifunction apparatus 1, the CCD line sensor 20 is fixed to a predetermined reading position to read a document which passes the reading position by an operation of an ADF device 150. When a stationary document reading function is activated in the multifunction apparatus 1, the CCD line sensor 20 is moved in an image reading direction below a platen 102A, on which a document is placed, by a torque of the reading motor MT2 controlled by the aforementioned drive control unit 17, to read image information of the document line by line while being moved.

The reading motor MT2 includes a DC (Direct Current) motor. A scanner unit 101 provided in the multifunction apparatus 1 includes an image reading window (hereinafter referred to as a "stationary reading window") 102 and an image reading window (hereinafter referred to as an "automatic reading window") 103. The stationary reading window 102 is used while the stationary document reading function is activated, while the automatic reading window 103 is used while the automatic conveyance and reading function is activated. The image reading windows 102 and 103 are closed by transparent platens 102A and 103A made of glass, acryl or the like.

A cover 104 which covers the image reading windows 102 and 103 is pivotably assembled in an upper surface portion of the scanner unit 101. When document reading is performed through the stationary reading window 102, the cover 104 is manually opened upward by a user, and a document is placed on the stationary reading window 102.

The CCD line sensor 20 is movably disposed in the scanner unit 101 such that the CCD line sensor 20 receives a reflection of light irradiated to a document immediately under the image reading windows 102 and 103 and generates a pixel signal based on the received light. A longitudinal direction of the CCD line sensor 20 (that is, an arrangement direction of the light receiving elements) extends perpendicular to a moving direction of the CCD line sensor 20.

The CCD line sensor 20 is assembled to the scanner unit 101 through a carriage 106 so as to move in a longitudinal direction of the scanner unit 101 (right and left direction in FIG. 2). The CCD line sensor 20 is stationarily arranged immediately below the automatic reading window 103 (i.e., home position) while the automatic conveyance and reading function is activated. The CCD line sensor 20 is then controlled by the reading control unit 21 to read image information of a document passing over the automatic reading window 103. In contrast, while the stationary document reading function is activated, the COD line sensor 20 is moved at a constant velocity immediately below the stationary reading window 102 to read image information of a document placed on the platen 102A line by line.

In the present embodiment, the carriage 106 is connected to a belt 109 held between a driving pulley 107 and a driven pulley 108. The belt 109 is connected to the reading motor MT2 through a gear. Specifically, the CCD line sensor 20 receives the torque of the reading motor MT2 through the belt 109. Being guided along a guide shaft 111 disposed in parallel with the belt 109, the CCD line sensor 20 moves linearly in a longitudinal direction of the scanner unit 101.

Figure 3:
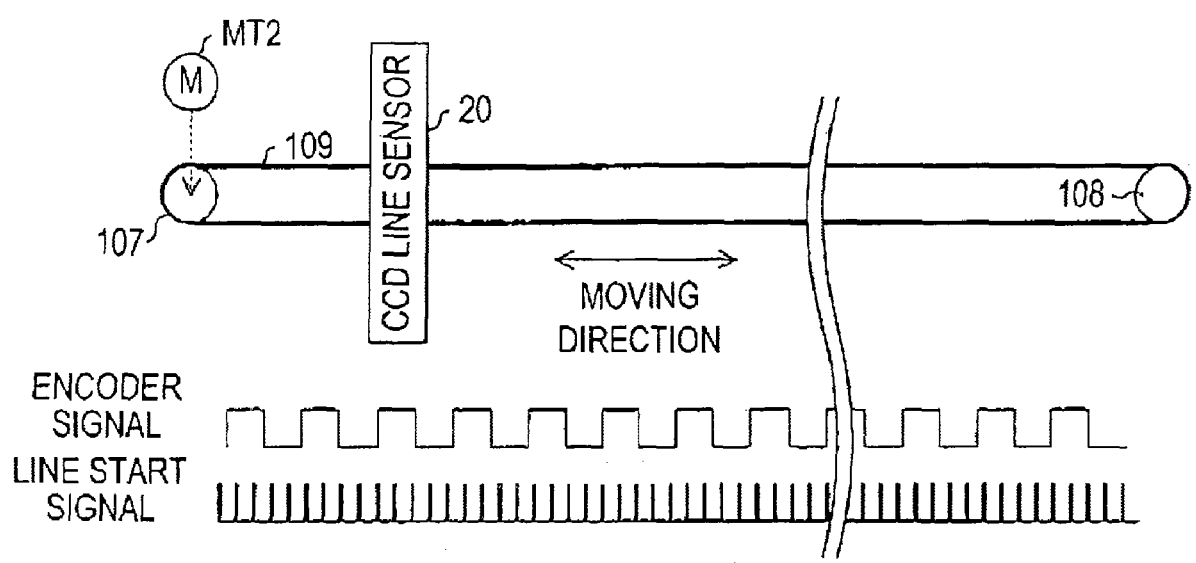
FIG. 3 is an explanatory view illustrating a moving state of a CCD line sensor of the multifunction apparatus.

The aforementioned reading encoder EN2 is provided to a rotating shaft of the reading motor MT2. The reading encoder EN2 is constituted as a rotary encoder which outputs pulse signals (A-phase signal and B-phase signal) each time the rotating shaft of the reading motor MT2 rotates by a predetermined angle. In the multifunction apparatus 1 of the present embodiment, the CCD line sensor 20 is moved by a predetermined distance when the rotating shaft of the reading motor MT2 rotates by a predetermined angle. In the present embodiment, a position of the CCD line sensor 20 is detected by the encoder processing unit 15 based on either of the A-phase signal or the B-phase signal from the reading encoder EN2 (see FIG. 3). Also, a rotating direction of the reading motor MT2 is detected based on the A-phase and B-phase signals.

The drive control unit 17 controls the reading motor MT2 based on information indicating a moving state of the CCD line sensor 20 obtained by the encoder processing unit 15 in accordance with the pulse signals from the reading encoder EN2. The drive control unit 17 then moves the CCD line sensor 20 along the guide shaft 111 at a constant velocity while the stationary document reading function is activated.

The ADF device 150 for conveying a target document to be read to the automatic reading window 103 is provided at a portion of the cover 104 corresponding to the automatic reading window 103 or in vicinity thereof. When the automatic conveyance and reading function is activated in the multifunction apparatus 1, sheets of target document to be read are placed in a stacked manner on a document tray 165 by the user. The stacked sheets of document placed on the document tray 165 are conveyed to the automatic reading window 103 as a reading position by operation of the ADF device 150.

Specifically, the ADF device 150 serves as a separation mechanism for separating the stacked sheets of document sheet by sheet. The ADF device 150 includes a separation roller 153, a separation pad 154 and a suction roller 155. The separation roller 153 applies conveying force to an uppermost sheet of a plurality of vertically stacked sheets of document. The separation pad 154 is disposed to face the separation roller 153. The separation pad 154 contacts the sheet from an opposite side of the separation roller 153 to apply a predetermined conveyance resistance to the sheet. The suction roller 155 sucks the sheets of document stacked on the document tray 165 so as to feed the sheet to the separation roller 153.

The ADF device 150 also serves as a conveyance mechanism for conveying a sheet of document separated by the separation mechanism. The ADF device 150 includes a sheet feed roller 159, a pair of pinch rollers 160, a sheet presser 161, a sheet discharge roller 162 and a sheet sensor actuator 164. The sheet feed roller 159 applies conveying force while turning a conveying direction of the sheet separated and conveyed from the separation mechanism toward the image reading window 103. The pinch rollers 160 press the sheet against the sheet feed roller 159.

The sheet presser 161 presses the conveyed sheet against the image reading window 103. While the automatic conveyance and reading function is activated, the CCD line sensor 20 is located under the sheet presser 161 and reads the sheet passing the sheet presser 161. The sheet sensor actuator 164 is arranged upstream of the sheet presser 161 in the conveying direction and detects whether or not the sheet has passed.

In the present embodiment, a conveyance position of the sheet is detected by the encoder processing unit 15 (see FIG. 1) based on an on/off signal from the sheet sensor actuator 164 and pulse signals from a reading conveyance encoder EN4 (see FIG. 1) provided to a rotating shaft of a reading conveyance motor MT4 (see FIG. 1) which includes a DC motor.

In the present embodiment, the above described rollers constituting the ADF device 150 rotate in response to a torque of the reading conveyance motor MT4 thereby to convey the sheet from the document tray 165 to the sheet discharge tray 166.

The reading conveyance encoder EN4 is a rotary encoder which outputs pulse signals (A-phase signal and B-phase signal) each time the rotating shaft of the reading conveyance motor MT4 rotates by a predetermined angle. The multifunction apparatus 1 is configured such that when the rotating shaft of the reading conveyance motor MT4 rotates by a predetermined angle, a sheet of target document to be read is moved by predetermined distance. Specifically, in the present embodiment, a conveying distance of the sheet of target document to be read is detected based on either of the A-phase signal or the B-phase signal from the reading conveyance encoder EN4, and a moving direction of the target sheet to be read is detected based on the A-phase signal and the B-phase signal by the encoder processing unit 15.

In accordance with detected results, the multifunction apparatus 1 achieves the automatic conveyance and reading function by controlling conveyance of the read object sheet through the drive control unit 17 so as to convey the read object sheet to a reading position at a constant velocity, and by controlling the CCD line sensor 20 through the reading control unit 21.

The above described reading functions are used for achieving the scanner function, the copier function and the facsimile function.

For example, the stationary document reading function is activated according to a program executed by the CPU 11 when a reading key in the display operation panel 23 is pressed in a state where a document is not placed on the document tray 165. As a result of activation, a document placed on the stationary reading window 102 is read in the multifunction apparatus 1.

The automatic conveyance and reading function is activated according to a program executed by the CPU 11 when a reading key in the display operation panel 23 is pressed in a state where a document is placed on the document tray 165. As a result of activation, the document placed on the document tray 165 is read in the multifunction apparatus 1.

Whether or not a document is placed on the document tray 165 is determined based on a detection signal of a not shown sensor provided to the document tray 165.

(2) Detail of Encoder Processing Unit 15

Figure 4:
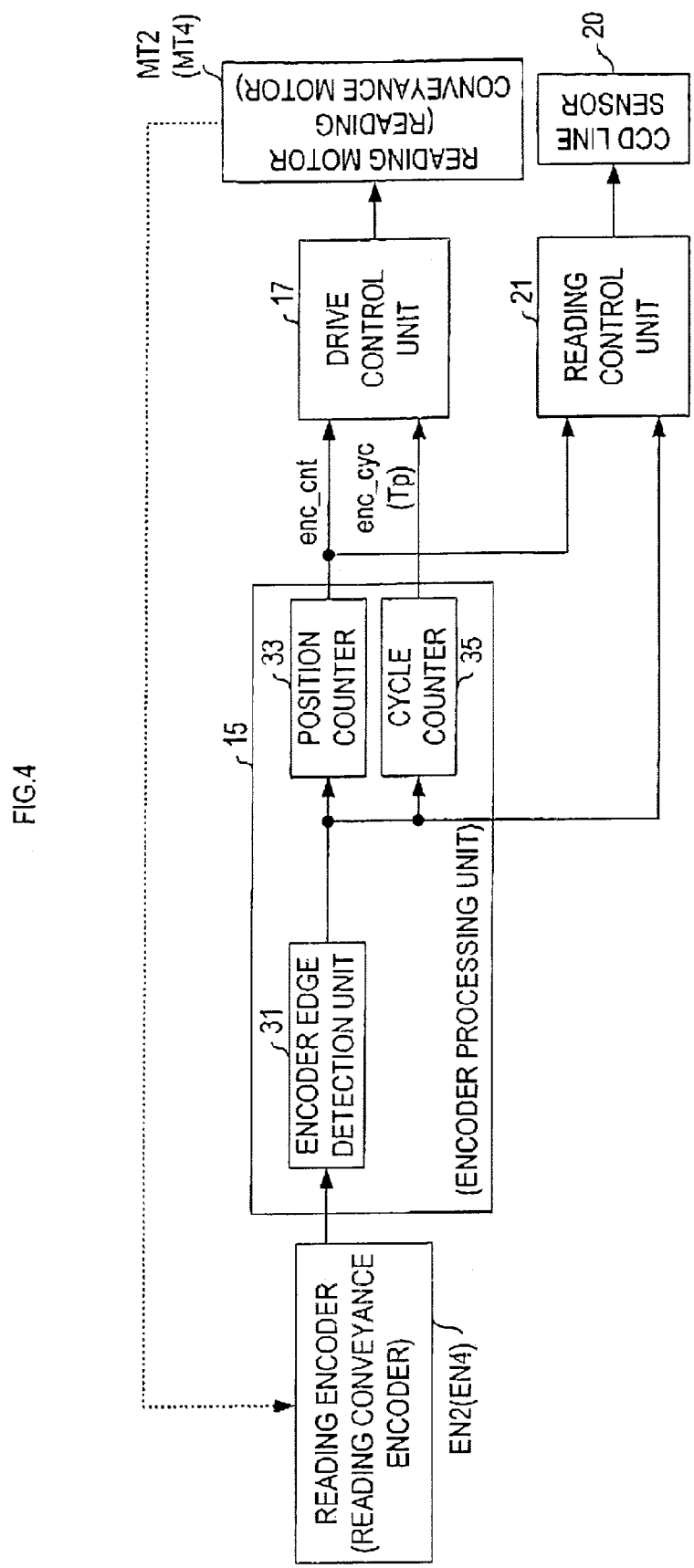
FIG. 4 is a block diagram showing a constitution of an encoder processing unit of the multifunction apparatus.
Figure 5A:
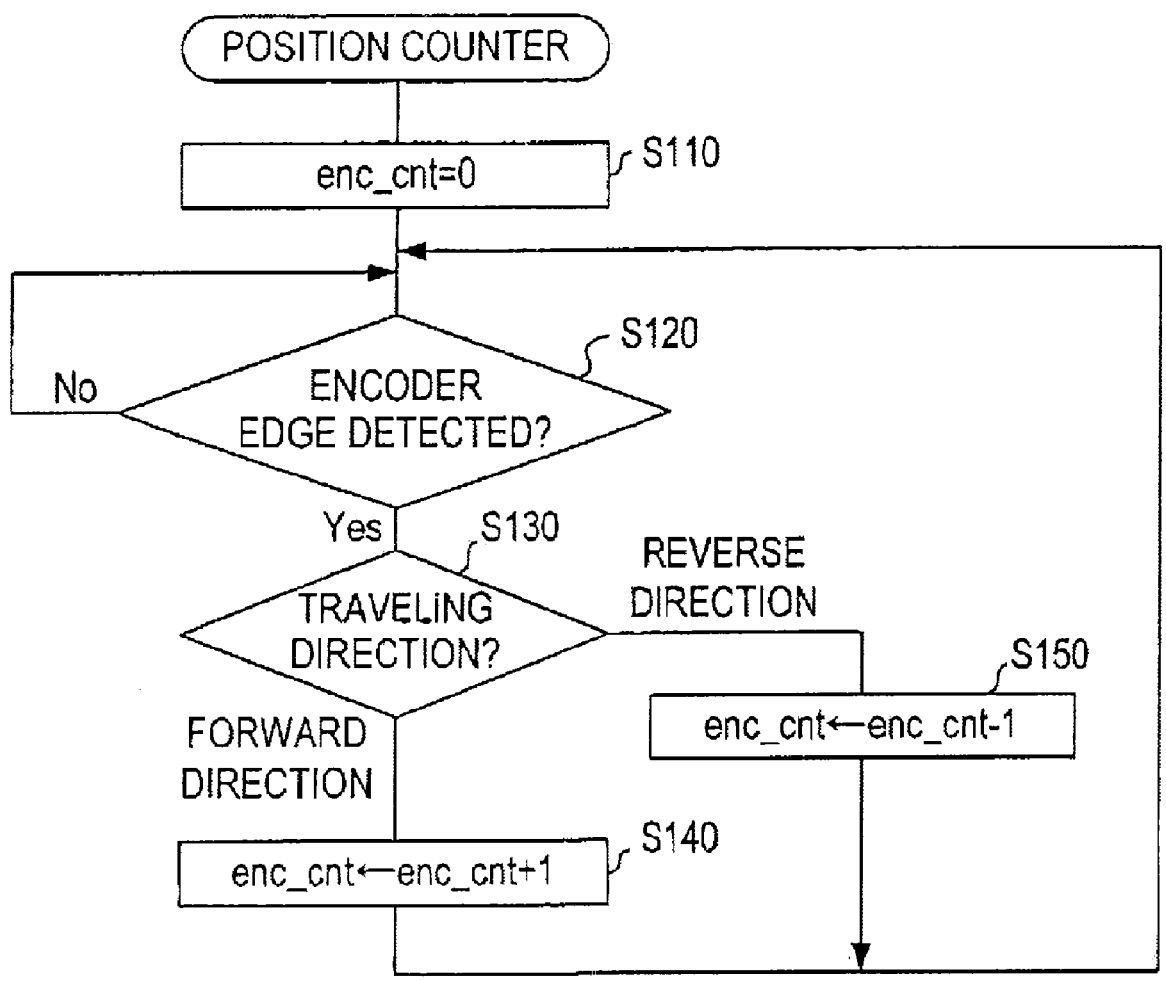
FIG. 5A is a flowchart showing a position counter process performed by a position counter.
Figure 5B:
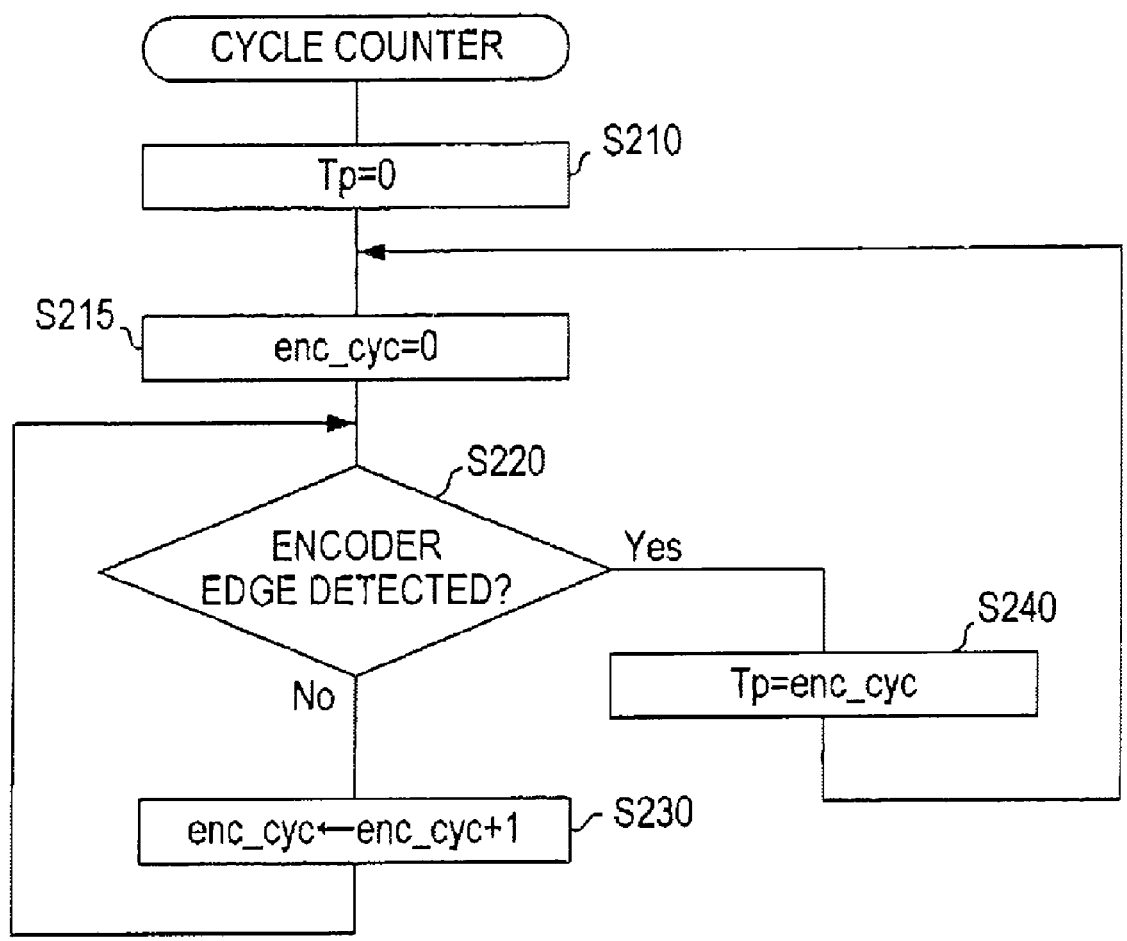
FIG. 5B is a flowchart showing a cycle counter process performed by a cycle counter.

A description will now be provided about the detailed constitution of the encoder processing unit 15 with reference to FIGS. 4, 5A and 5B.

In the encoder processing unit 15 in the present embodiment, each of the encoders EN1 to EN4 includes a set of an encoder edge detection unit 31, a position counter 33 and a cycle counter 35. Thereby, the encoder processing unit 15 detects rotation amounts of the rotating shafts of the motors MT1 to MT4 provided with the encoders EN1 to EN4, and thus travel distances of conveyed objects conveyed by the motors MT1 to MT4. FIG. 4 shows the encoder edge detection unit 31, the position counter 33 and the cycle counter 35 corresponding to the reading encoder EN2 (the reading conveyance encoder EN4) as components of the encoder processing unit 15.

Specifically, the encoder edge detection unit 31 of the encoder processing unit 15 detects a rising edge of pulse signals supplied from the corresponding encoder EN1 to EN4. The encoder edge detection unit 31 outputs an edge detection signal per detection of a rising edge. The edge detection signal is supplied to the corresponding set of the position counter 33 and the cycle counter 35.

A pulse signal (an encoder signal) from the reading encoder EN2 is supplied to the encoder edge detection unit 31 for the reading encoder EN2. An edge detection signal outputted from the encoder edge detection unit 31 for the reading encoder EN2 is supplied to the position counter 33 and the cycle counter 35 for the reading encoder EN2. While the stationary document reading function is activated, the edge detection signal is also supplied to reading control unit 21.

A value enc_cnt outputted from the position counter 33 for the reading encoder EN2 and values enc_cyc and Tp outputted from the cycle counter 35 are supplied to the drive control unit 17. The value enc_cnt outputted from the position counter 33 for the reading encoder EN2 is supplied to the reading control unit 21 while the stationary document reading function is activated.

An edge detection signal outputted from the encoder edge detection unit 31 for the reading conveyance encoder EN4, to which a pulse signal from the reading conveyance encoder EN4 is supplied, is supplied to the position counter 33 and the cycle counter 35 for the reading conveyance encoder EN4. While the automatic conveyance and reading function is activated, the edge detection signal is also supplied to the reading control unit 21.

A value enc_cnt outputted from the position counter 33 for the reading conveyance encoder EN4 and values enc_cyc and Tp outputted from the cycle counter 35 are supplied to the drive control unit 17. The value enc_cnt outputted from the position counter 33 for the reading conveyance encoder EN4 is also supplied to the reading control unit 21 while the automatic conveyance and reading function is activated.

The position counter 33 for the reading encoder EN2 starts a process shown in FIG. 5A when the multifunction apparatus 1 is started and the CCD line sensor 20 is also located in the home position at the time. Thereafter, the position counter 33 continuously updates the value enc_cnt. The position counter 33 for the reading conveyance motor MT4 starts the position counter process shown in FIG. 5A each time a document to be read is fetched through the ADF device 150 and the front end of the document to be read is arranged at a predetermined fetch point (point where an output signal of the document sensor actuator 164 is switched from off to on).

Although a description will be provided below with respect to the position counter process performed by the position counter 33 for the reading encoder EN2 using FIG. 5A, the same process as performed by the position counter 33 for the reading encoder EN2 is performed in the position counter 33 for the other encoders.

As shown in FIG. 5A, when the position counter process is started by the position counter 33 for the reading encoder EN2, a variable enc_cnt is reset to 0 (S110). Then, an input of an edge detection signal from the encoder edge detection unit 31 for the reading encoder EN2 is waited for (S120).

When the edge detection signal is supplied, a rotating direction of the corresponding reading motor MT2 is determined (S130). When it is determined that the rotating direction of the reading motor MT2 is a forward direction, the variable enc_cnt is incremented by 1 (S140). The present process proceeds to S120. When it is determined that the rotating direction of the reading motor MT2 is a reverse direction, the variable enc_cnt is decremented by 1 (S150). The present process proceeds to S120.

That is, the position counter 33 counts up the variable enc_cnt each time an edge signal is supplied when the reading motor MT2 rotates in the forward direction. The position counter 33 counts down the variable enc_cnt each time an edge signal is supplied when the reading motor MT2 rotates in the reverse direction. Thereby, a position of the CCD line sensor 20 is detected by the position counter 33 for the reading motor MT2.

The cycle counter 35 continuously updates the values enc_cyc and Tp when a later-explained reading control process is started by the CPU 11, until the reading control process is ended.

Although a description will be provided below with respect to a cycle counter process performed by the cycle counter 35 for the reading encoder EN2 using FIG. 5B, the same process as performed by the cycle counter 35 for the reading encoder EN2 is performed in the cycle counter 35 for the other encoders.

As shown in FIG. 5B, when the cycle counter process is started by the cycle counter 35 for the reading encoder EN2, a variable Tp is reset to 0 (S210) and a variable enc_cyc is reset to 0 (S215). Then, it is determined whether or not an edge detection signal is supplied from the encoder edge detection unit 31 for the reading encoder EN2 (S220).

When it is determined that an edge detection signal is not supplied (S220: No), the variable enc_cyc is incremented by 1 (S230). The present process proceeds to S220. When it is determined that an edge detection signal is supplied (S220: Yes), the variable Tp is set to a current value of the variable enc_cyc (S240). The present process proceeds to S215.

In the above described operation, the cycle counter 35 measures a time period during which an edge detection signal is not supplied. Specifically, the cycle counter 35 is operated synchronously with the clock signal supplied from the clock generation unit 25 and counts up the variable enc_cyc at a cycle of the clock signal in S230, thereby measuring elapsed time since the last supply of an edge detection signal. When an edge detection signal is supplied next time, elapsed time enc_cyc since the last supply of the edge detection signal until a current supply of the edge detection signal is outputted as the value Tp (S240). According to the operation as above, the cycle counter 35 for the reading encoder EN2 detects a time required for the rotating shaft of the reading motor MT2 to rotate a predetermined angle, and thus a moving time of the CCD line sensor 20 per unit distance.

(3) Detail of Reading Control Unit 21

Referring to FIG. 6, the reading control unit 21 provided in the multifunction apparatus 1 includes a reading front end 41, an image data processing unit 43, a local RAM 45, a stop request generation unit 47, and a line start output command unit 49. The reading control unit 21 controls reading operation of the CCD line sensor 20 using these components. Descriptions will now be provided below on details of the respective components.

(3.1) Details of Reading Front End 41

The reading front end 41 of the present embodiment is connected to the CCD line sensor 20. The reading front end 41 supplies a control signal to the CCD line sensor 20, and receives a reading result from the CCD line sensor 20 as a pixel signal to be processed.

The reading front end 41 includes a line start trigger signal generation unit 41a, a line start signal generation unit 41b and a transfer clock signal generation unit 41c. The reading front end 41 periodically generates a line start trigger (l_start_trg) signal through the line start trigger signal generation unit 41*a*.

A line start trigger signal is a signal for specifying an output timing of a line start signal. The line start signal specifies a reading timing of a line image by the CCD line sensor 20. The line start trigger signal is generated by the line start trigger signal generation unit 41*a* at an input cycle of the line start signal to the COD line sensor 20, to be supplied to the line start signal generation unit 41*b*.

The line start trigger signal generation unit 41*a* starts output of a line start trigger signal when a line start output command is supplied from the line start output command unit 49. Thereafter, the line start trigger signal generation unit 41*a* outputs line start trigger signals periodically. When a reading stop signal is outputted from the image data processing unit 43, or a logical value of a stop request (req_stop) signal is changed from 1 to 0, the line start trigger signal generation unit 41*a* stops output of a line start trigger signal, and stands by until a line start output command is received from the line start output command unit 49.

Once a line start output command is received from the line start output command unit 49 again, the line start trigger signal generation unit 41*a* restarts output of a line start trigger signal.

The line start signal generation unit 41*b* supplies to the CCD line sensor 20 a line start signal having a specific pulse width adapted to the CCD line sensor 20 at an input timing of a line start trigger signal. When the line start signal is supplied to the CCD line sensor 20, electric charges generated in the light receiving elements are supplied to the CCD analog shift register 20*b* in the CCD line sensor 20. Thereby, image information read before the line start signal is stored and retained in the CCD analog shift register 20*b*. At this timing, the electric charges are discharged in the light receiving elements. Reading operation is newly performed using a photoelectric effect.

In the present embodiment, the resolution performance of each of the encoders EN2 and EN4 is set lower than the reading resolution by the scanner function in order to manufacture a product at a lower cost. As a result, a line start signal having a shorter cycle than cycles of the pulse signals outputted from the encoders EN2 and EN4 is supplied to the CCD line sensor 20 while the conveyed object (CCD line sensor 20 or read object) is moved at a constant velocity by the operation of the drive control unit 17, asynchronously with the pulse signals outputted from the encoders EN2 and EN4 (see FIG. 3).

The transfer clock signal generation unit 41*c* generates a transfer clock signal for making the CCD analog shift register 20*b* output a pixel signal. The transfer clock signal is supplied to the CCD line sensor 20.

When the transfer clock signal is inputted, pixel information stored in the CCD analog shift register 20*b* is outputted in series, as a pixel signal, from the CCD analog shift register 20*b* during a period before a next line start signal is supplied. The pixel signal supplied from the CCD analog shift register 20*b* to the reading front end 41 is converted into digital pixel data by an A/D (analog/digital) converter 41*d* included in the reading front end 41. The pixel data for one line is arranged in a serial manner and is transferred as line image data to the image data processing unit 43.

The transfer clock signal generation unit 41*c* performs operation of discarding the pixel signal outputted from the CCD line sensor 20 during a period of time since when a line start output command is supplied and input of a line start signal to the CCD line sensor 20 is started until when the next line start signal is supplied. The transfer clock signal generation unit 41*c* also immediately stops output of a transfer clock signal when a reading termination signal is outputted from the image data processing unit 43 or the logical value of the req_stop signal is changed from 1 to 0. When output of a line start signal is restarted, output of a transfer clock signal is restarted.

The reading front end 41 constituted as such stops/restarts (starts) transfer operation of line image data to the image data processing unit 43 in accordance with stop/restart (start) of output of a transfer clock signal. The reading front end 41 supplies a line start trigger signal outputted from the line trigger signal generation unit 41*a* to the stop request generation unit 47 and the line start output command unit 49.

(3.2) Details of Image Data Processing Unit 43

Referring to FIG. 6, the image data processing unit 43 of the present embodiment sequentially writes line image data supplied from the reading front end 41 to a buffer 45*a* as a FIFO memory provided in the local RAM 45, performs image processing such as shading correction and gamma correction to each line image data stored in the buffer 45*a*, and writes the each line image data after the image processing to the RAM 13 through a memory controller 50.

The image data processing unit 43 also has a stop/restart control function. Specifically, the image data processing unit 43 outputs a stop_sig signal or a restart_sig signal for stopping or restarting transfer of the line image data from the reading front end 41 based on free space in the buffer 45*a*.

Figure 7:
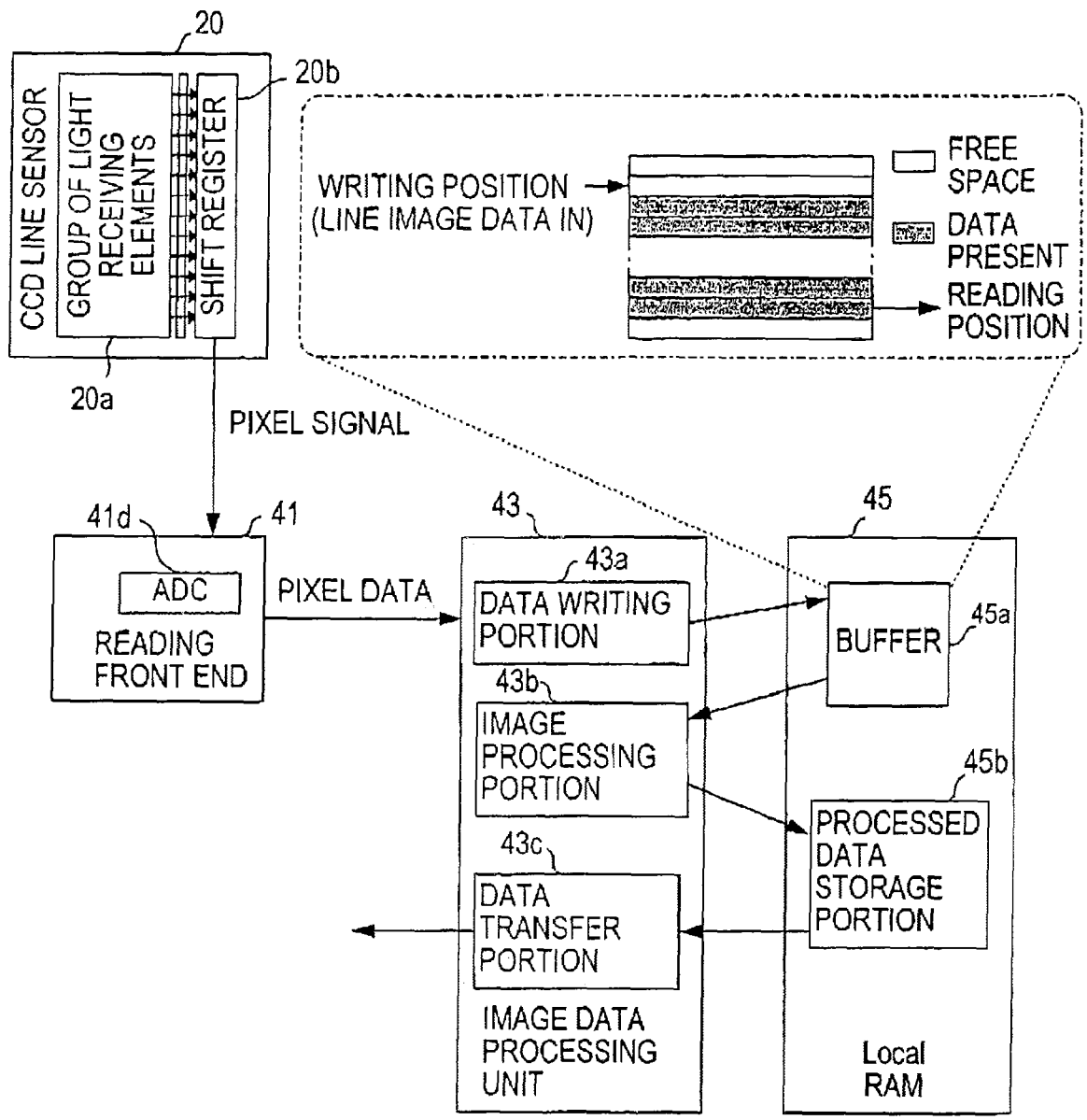
FIG. 7 is an explanatory view illustrating a data processing function achieved by an image data processing unit of the multifunction apparatus.

As shown in FIG. 7, the image data processing unit 43 includes a data writing portion 43*a*, an image processing portion 43*b* and a data transfer portion 43*c* in order to achieve the data processing function. Each time line image data as image data for one line is supplied from the reading front end 41, the image data processing unit 43 writes the line image data to the buffer 45*a* through the data writing portion 43*a*.

The image data processing unit 43 reads line image data stored in a reading position of the buffer 45*a*, performs image processing such as shading correction and gamma correction to the line image data, and temporarily stores the line image data after the image processing in a processed data storage portion 45*b* in the local RAM 45 through the image processing portion 43*b*. The image data processing unit 43 writes the line image data stored in the processed data storage portion 45*b* to the RAM 13 through the data transfer portion 43*c* thereby to create image data representing a read image on the RAM 13.

Function blocks in the image data processing unit 43 shown in FIG. 6 indicate function blocks for the above-mentioned stop/restart control function.

As shown in FIG. 6, the image data processing unit 43 of the present embodiment includes a stop signal generation portion 43*d* that outputs a stop_sig signal and a restart signal generation portion 43*e* that outputs a restart_sig signal. The stop signal generation portion 43*d* performs a stop signal generation process shown in FIG. 8 to change a state of the stop_sig signal to be outputted.

The stop signal generation portion 43*d* performs the stop signal generation process each time reading control per read object is started (particularly, each time a reading start request is supplied from the CPU 11 (see FIGS. 20A and 20B)).

Figure 8:
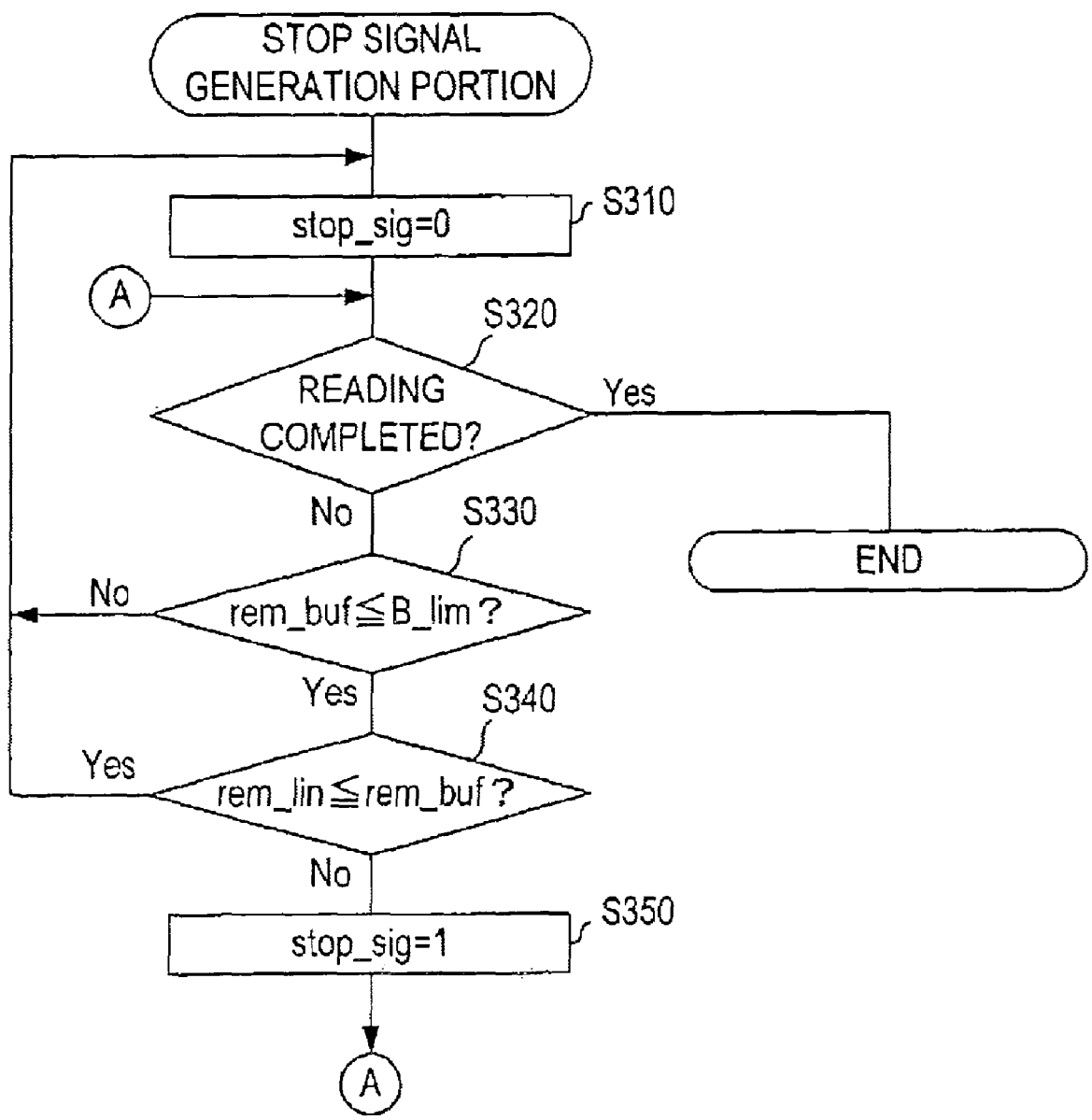
FIG. 8 is a flowchart showing a stop signal generation process performed by a stop signal generation portion of the multifunction apparatus.

As shown in FIG. 8, when the stop signal generation process is started by the stop signal generation portion 43*d*, a logical value of the stop_sig signal is initially set to 0 (S310).

Then, it is determined whether or not acquisition of line image data up to a reading completion line has been completed based on a number of lines of the line image data supplied from the reading front end 41 (S320).

When it is determined that acquisition of line image data up to the reading completion line has been completed (S320: Yes), output of the stop_sig signal is stopped. In a case where acquisition of line image data up to the reading completion line has been completed, the stop signal generation portion 43d outputs a reading completion signal to notify respective components of completion of reading.

When it is determined that acquisition of line image data up to the reading completion line has not been completed (S320: No), it is then determined whether or not an amount of free space rem_buf of the buffer 45a is equal to or smaller than a predetermined threshold value B_lim (S330).

When it is determined that the amount of free space rem_buf of the buffer 45a is not equal to or smaller than the threshold value B_lim (S330: No), the amount of free space is regarded as sufficient for writing the line image data. The present process returns to S310. The logical value of the stop_sig signal is set to 0.

When it is determined that the amount of free space rem_buf of the buffer 45a is equal to or smaller than the threshold value B_lim (S330: Yes), it is then determined whether or not a total amount rem_lin of line image data up to the reading completion line, which should be subsequently written, is equal to or smaller than the amount of free space rem_buf of the buffer 45a (S340).

When it is determined that the total amount rem_in is equal to or smaller than the amount of free space rem_buf (S340: Yes), it is regarded that the buffer 45a will not be filled up until completion of reading. The present process returns to S310. The logical value of the stop_sig signal is set to 0 to control so as not to stop output of the line image data from the reading front end 41.

When it is determined that the total amount rem_lin is larger than the amount of free space rem_buf (S340: No), the logical value of the stop_sig signal is changed from 0 to 1 so that output of the line image data from the reading front end 41 is stopped (S350). Then, the present process returns to S320. The stop_sig signal, a state of which may be changed as described above, is supplied to the stop request generation unit 47.

Figure 9:
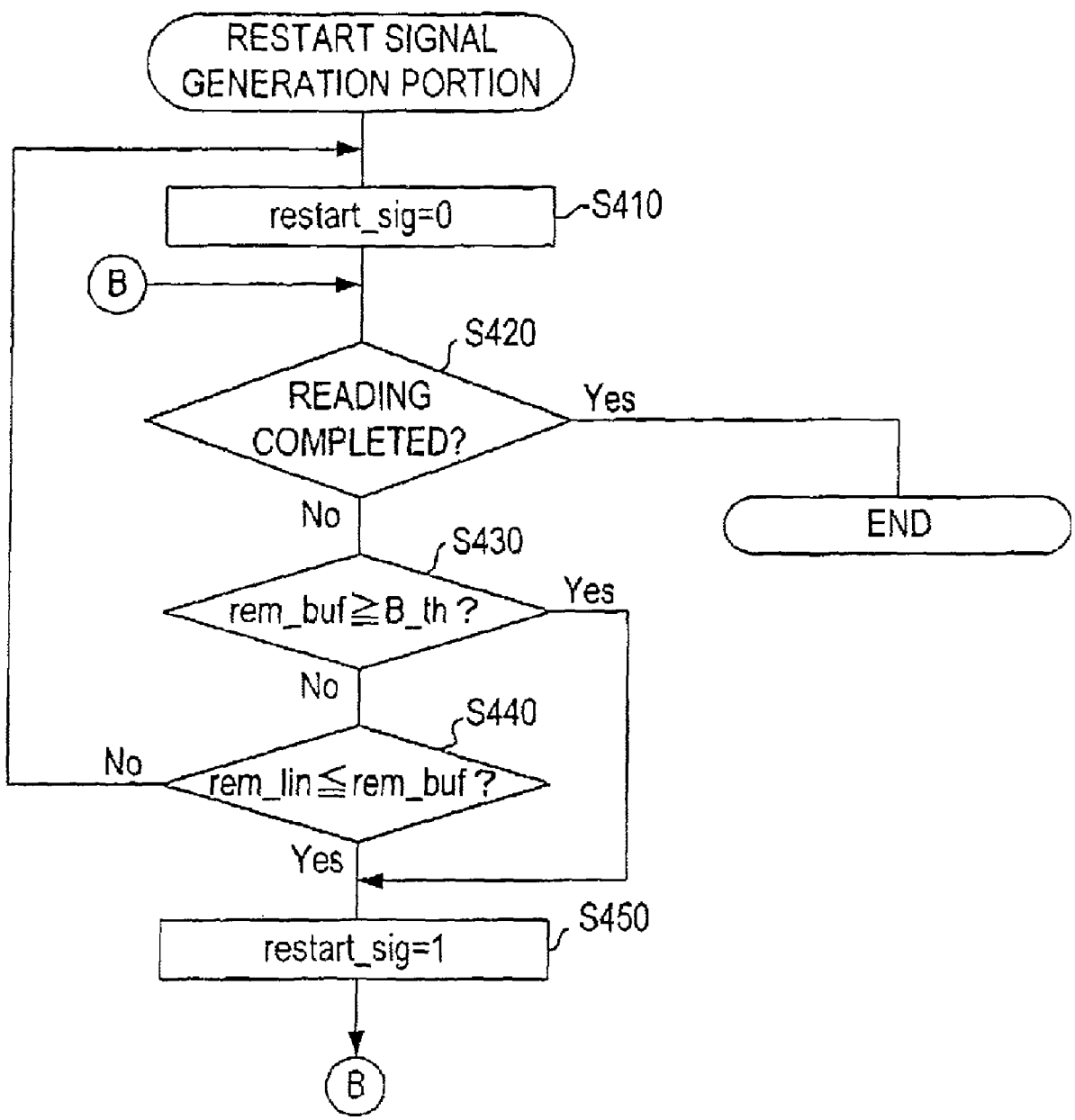
FIG. 9 is a flowchart showing a restart signal generation process performed by a restart signal generation portion of the multifunction apparatus.

The restart signal generation portion 43e specifically performs a restart signal generation process shown in FIG. 9 to change a state of a restart_sig signal. The restart signal generation portion 43e performs the restart signal generation process each time reading control per read object is started (particularly, each time a reading start request is supplied from the CPU 11 (see FIGS. 20A and 20B)).

As shown in FIG. 9, when the restart signal generation process is started by the restart signal generation portion 43e, a logical value of the restart_sig signal is initially set to 0 (S410). Then, it is determined whether or not acquisition of line image data up to a reading completion line has been completed based on a number of lines of the line image data inputted from the reading front end 41 (S420). When it is determined that acquisition of line image data up to the reading completion line has been completed (S420: Yes), output of the restart_sig signal is stopped.

When it is determined that acquisition of line image data up to the reading completion line has not been completed (S420: No), it is determined whether or not an amount of free space rem_buf of the buffer 45a is equal to or larger than a predetermined threshold value B_th (S430).

When it is determined that the amount of free space rem_buf is equal to or larger than the threshold value B_th (S430: Yes), the amount of free space rem_buf of the buffer 45a is regarded as sufficient for restart, and the logical value of the restart_sig signal is changed from 0 to 1 (S450). The present process returns to S420. Here, the threshold value B_th is set to a value larger than the threshold value B_lim (B_th>B_lim).

When it is determined that the amount of free space rem_buf of the buffer 45a is smaller than the threshold value B_th (S430: No), it is then determined whether or not the amount of free space rem_buf of the buffer 45a is equal to or larger than a total amount rem_lin of line image data up to the reading completion line, which should be subsequently written (S440). When it is determined that the amount of free space rem_buf is equal to or larger than the total amount rcm_lin (S440: Yes), it is regarded that the amount of free space rem_buf of the buffer 45a is sufficient for restart. The logical value of the restart_sig signal is changed from 0 to 1 (S450). The present process returns to S420.

When it is determined that the amount of free space rem_buf of the buffer 45a is not equal to or larger than the threshold value B_th, and also equal to or larger than the total amount rem_lin (S440: No), the amount of free space rem_buf of the buffer 45a is regarded as insufficient for restart. The present process returns to S410, and the logical value of the restart_sig signal is set to 0. The present process proceeds to S420.

The restart_sig signal whose state is changed as described above is supplied to the CPU 11. The CPU 11 continuously monitoring the restart_sig signal. The CPU 11 supplies a reading restart command to the line start output command unit 49 when the logical value of the restart_sig signal is changed from 0 to 1 (details will be given later).

(3.3) Details of Stop Request Generation Unit 47

The stop request generation unit 47 outputs a req_stop signal. The stop request generation unit 47 starts a stop request generation process shown in FIG. 10 each time reading control per read object is performed (particularly, each time a reading start request is supplied from the CPU 11 (see FIGS. 20A and 20B)). The stop request generation unit 47 changes a state of the req_stop signal in accordance with the stop_sig signal outputted from the stop signal generation portion 43d.

Figure 10:
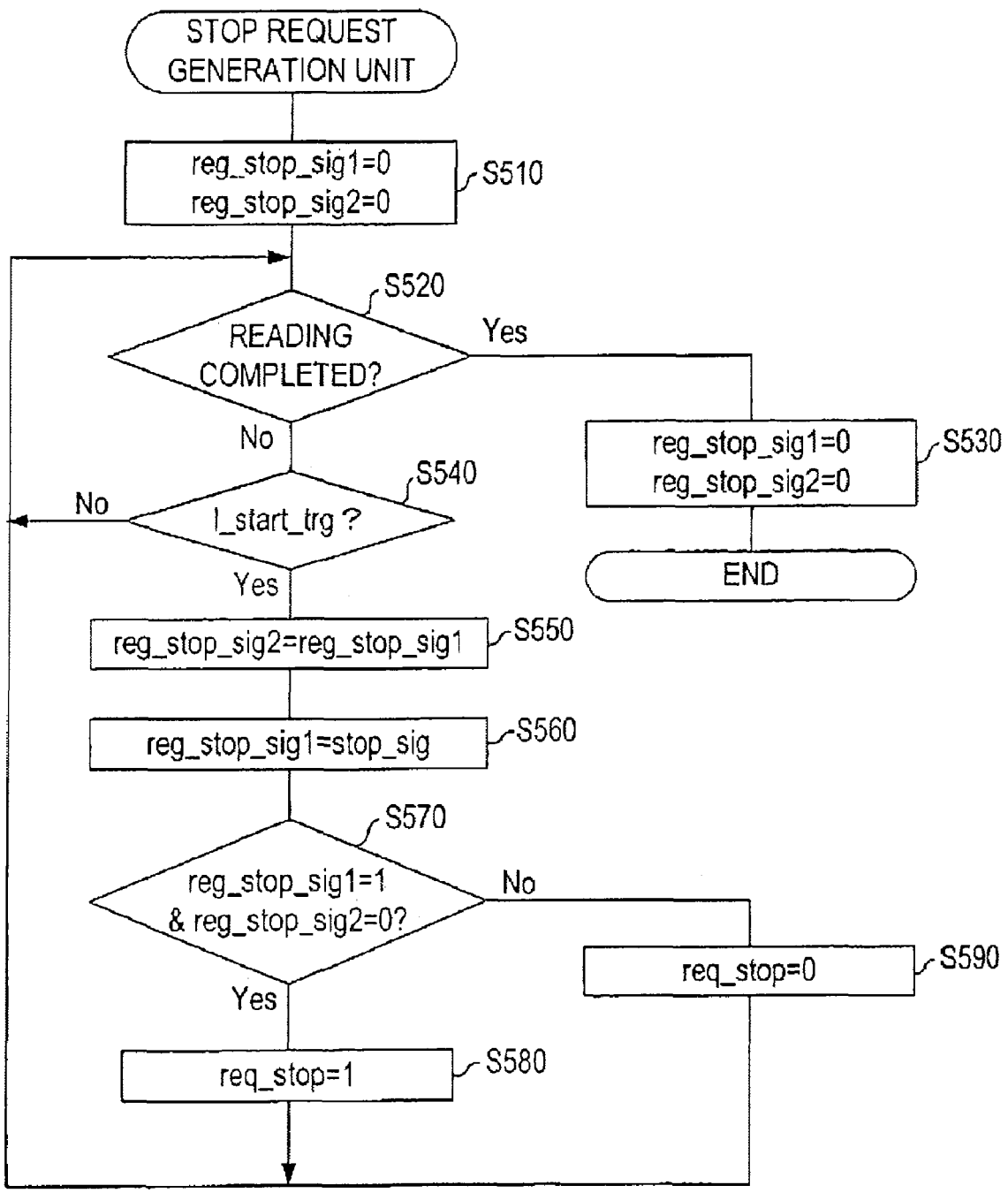
FIG. 10 is a flowchart showing a stop request generation process performed by a stop request generation unit of the multifunction apparatus.

As shown in FIG. 10, when the stop request generation process is started by the stop request generation unit 47, a variable reg_stop_sig1 is set to 0, and a variable reg_stop_sig2 is set to 0 (S510).

Subsequently, it is determined whether or not a reading completion signal has been supplied from the image data processing unit 43 thereby to determine whether or not reading of a read object (reading of a sheet of document) has been completed (S520).

When it is determined that the reading has been completed (S520: Yes), the variable reg_stop_sig1 is again set to 0 and the variable reg_stop_sig2 is also set to 0 (S530). The present process is ended.

When it is determined that reading has not been completed (S520: No), completion of reading or an input of a line trigger signal is waited for. When a line start trigger signal is supplied (S540: Yes), the value of the variable reg_stop_sig1 is set to the variable reg_stop_sig2 (S550). Also, a logical value of the stop_sig signal (0 or 1) is set to the variable reg_stop_sig1 (S560).

Figure 11:
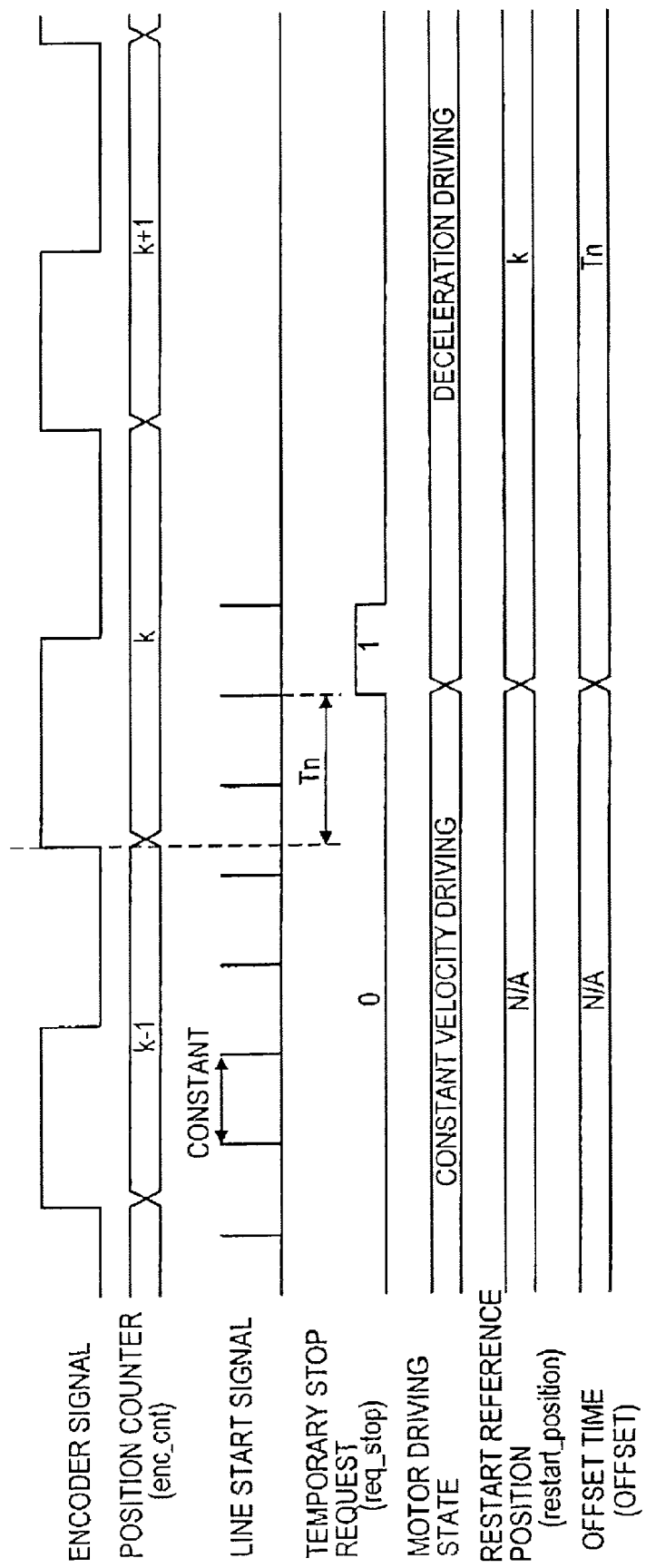
FIG. 11 is a time chart showing states of various signals before and after the logical value of a req_stop signal is changed to 1 in the multifunction apparatus.

When it is determined that reg_stop_sig1=1 and reg_stop_sig2=0 (S570: Yes), the logical value of the req_stop signal is set to 1 (S580). Otherwise, the logical value of the req_stop signal is set to 0 (S590). Then, the present process returns to S520. As described above, the state of the req_stop signal is changed synchronously with an output timing of a line start signal in the present embodiment (see FIG. 11).

The req_stop signal outputted from the stop request generation unit 47 is supplied to the line start output command unit 49 as well as to the drive control unit 17.

(3.4) Details of Line Start Output Command Unit 49

As shown in FIG. 6, the line start output command unit 49 includes an offset setting portion 49a and an output command portion 49b. The line start output command unit 49 determines an output starting position of a line start signal through the offset setting portion 49a and supplies a line start output command to the reading front end 41 in accordance with the determination result through the output command portion 49b. In this manner, the line start output command unit 49 makes the CCD line sensor 20 to resume reading operation from the determined output starting position.

Figure 12:
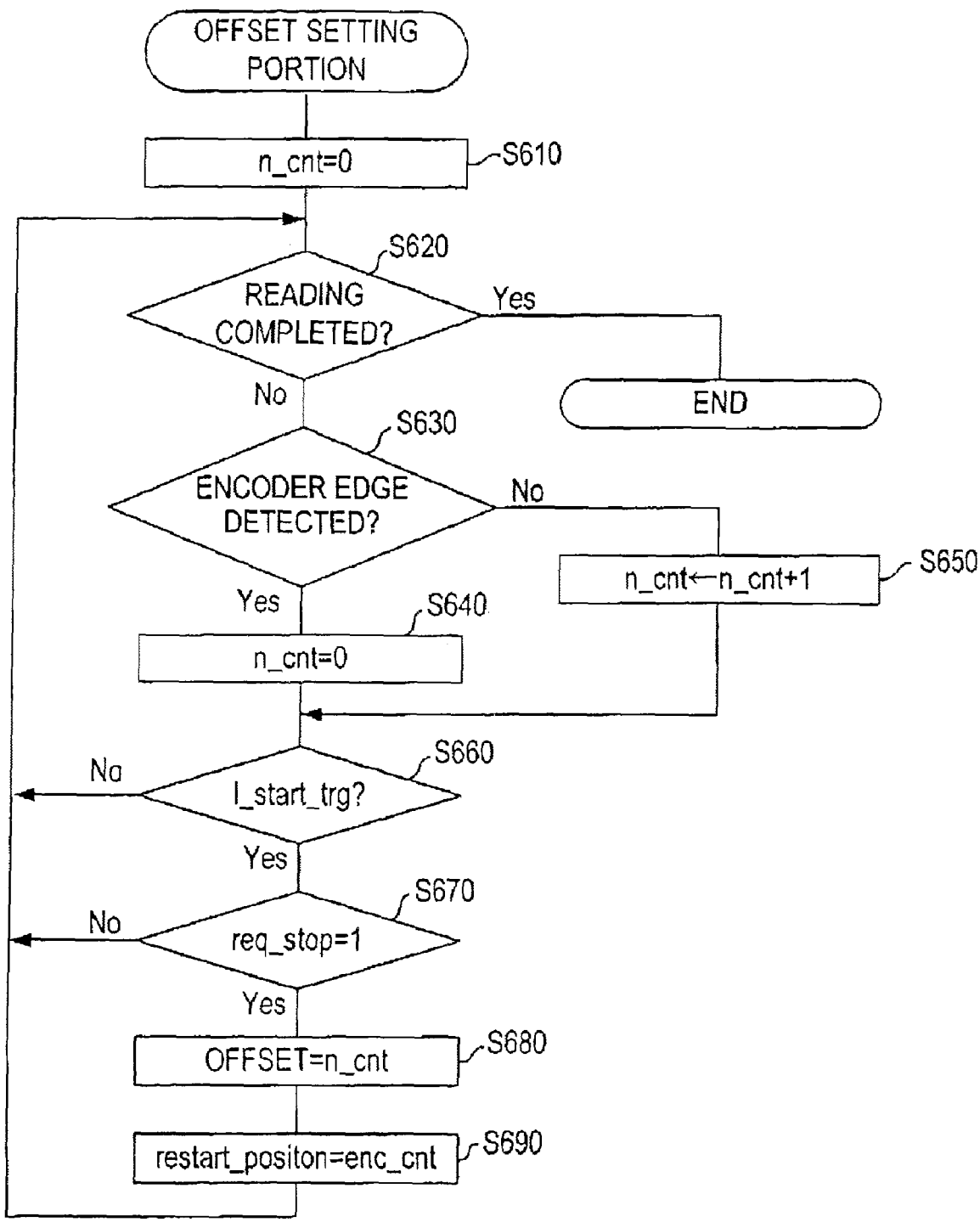
FIG. 12 is a flowchart showing an offset setting process performed by an offset setting portion of the multifunction apparatus.

Particularly, each time reading control is performed per read object (that is, each time a reading start request is supplied from the CPU 11 (see FIGS. 20A and 20B)), the offset setting portion 49a starts a offset setting process shown in FIG. 12.

Referring to FIG. 12, when the offset setting process is started, the offset setting portion 49a sets a variable n_cnt to 0 (S610). The offset setting portion 49a determines whether reading of the read object is completed by determining whether a reading complete signal is supplied from the image data processing unit 43 (S620). If it is determined that reading is completed (S620: Yes), the process is ended.

If it is determined that reading is not completed (S620: No), the offset setting portion 49a determines whether an edge detection signal is supplied (S630). If it is determined that an edge detection signal is supplied (S630: Yes), the variable n_cnt is set to 0 (S640). Otherwise (S630: No), the variable n_cnt is incremented by 1 (S650).

Then, if a line start trigger signal is not supplied (S660: No), the process moves to S620. Operation of counting up the variable n_cnt is performed (S650) until reading is ended or a next edge detection signal is supplied. Once the edge detection signal is supplied, the variable n_cnt is reset (S640). Specifically, the offset setting portion 49a operates synchronously with a clock signal supplied from the clock generation unit 25 to count up the variable n_cnt at a cycle of the clock signal (S650). In this manner, elapsed time is measured from the last supply of an edge detection signal.

When a line start trigger signal is supplied (S660: Yes), it is determined whether the logical value of the req_stop signal is changed from 0 to 1 with supply of the line start trigger signal (S670). If it is determined that the logical value of the req_stop signal is changed from 0 to 1 with supply of the line start trigger signal (S670: Yes), the value of a variable OFFSET is set to a current value of the variable n_cnt (S680). The value of a variable restart_position is set to the enc_cnt supplied from the position counter 33 (S690). Then, the present process returns to S620. If the logical value of the req_stop signal is not changed from 0 to 1 with supply of the line start trigger signal (S670: No), the variables OFFSET and restart_position are not set. The process moves to S620.

In this manner, the offset setting portion 49a sets, as the variable OFFSET, time (Tn shown in FIG. 11) elapsed from the last supply of the edge detection signal until when a line start signal is lastly supplied to the CCD line sensor 20, in time in the past direction including the point when the logical value of the req_stop signal has been changed from 0 to 1. Also, the value enc_cnt supplied from the position counter 33 when the logical value of the req_stop signal is changed from 0 to 1 is set as a coordinate restart_position of the reading restart reference position.

Figure 13:
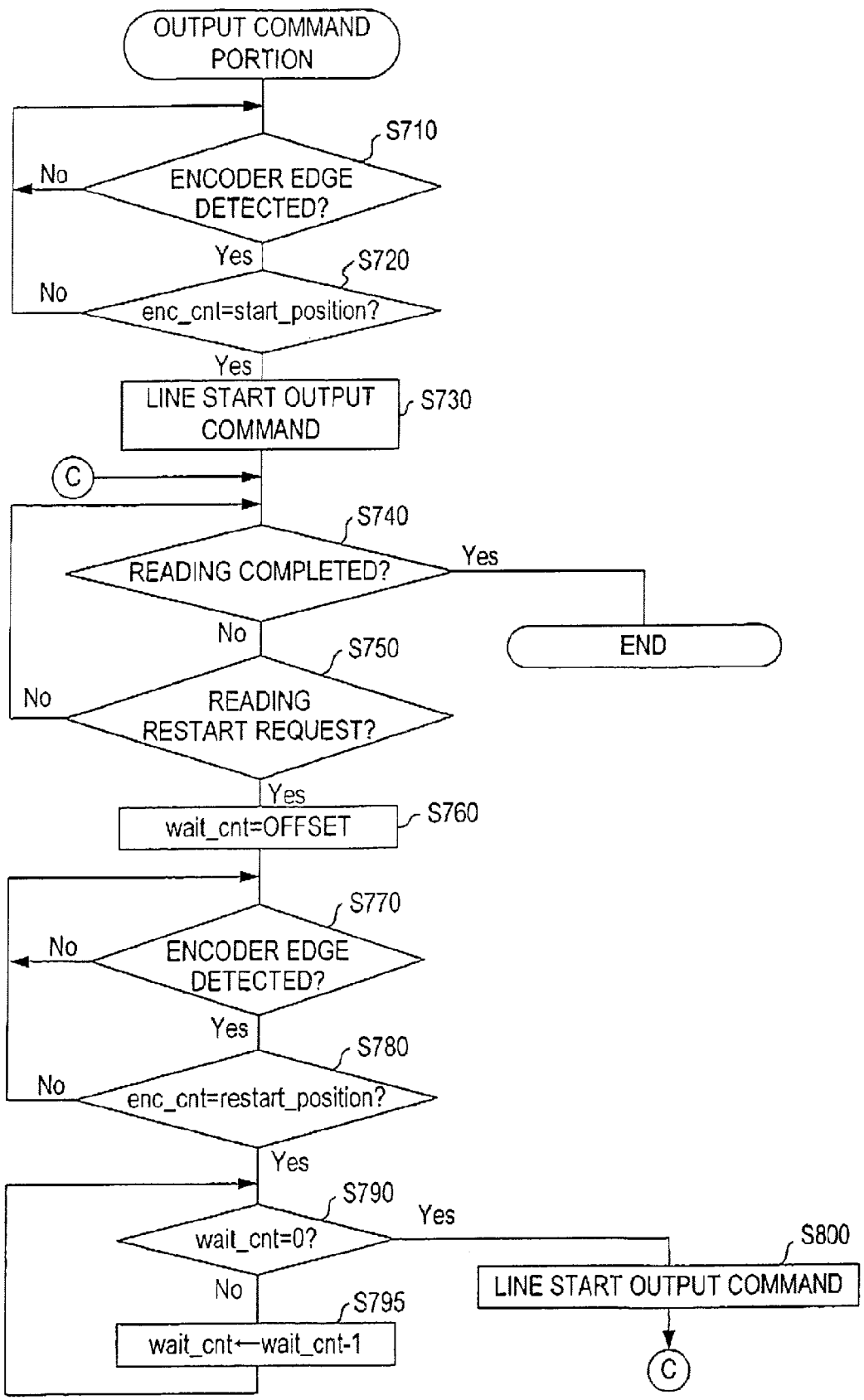
FIG. 13 is a flowchart showing an output command process performed by an output command unit of the multifunction apparatus.

The output command portion 49b performs an output command process shown in FIG. 13 each time reading control per read object is performed (that is, when a reading start request is supplied from the CPU 11 (see FIGS. 20A and 20B)).

As shown in FIG. 13, when the output command process is started, the output command portion 49b stands by until an edge detection signal is supplied (S710). When an edge detection signal is supplied (S710: Yes), it is determined whether the conveyed object has reached a reading start position based on the value enc_cnt supplied from the position counter 33 at the time. Particularly, it is determined whether the value enc_cnt supplied from the position counter 33 is consistent with a coordinate start_position of the reading start position which is set based on a command from the CPU 11.

If the value enc_cnt supplied from the position counter 33 is not consistent with the coordinate start_position of the reading start position (S720: No), it is determined that the conveyed object has not reached the reading start position. The output command portion 49b stands by until the value enc_cnt corresponds to the coordinate start_position (S710, S720). If the value enc_cnt supplied from the position counter 33 is consistent with the coordinate start_position of the reading start position (S720: Yes), it is determined that the conveyed object has reached the reading start position. A line start output command is supplied to the reading front end 41 (S730).

When the line start output command is supplied as above, the output command portion 49b determines whether a reading complete signal is supplied from the image data processing unit 43 to determine whether reading of the read object is completed (S740). When reading is completed (S740: Yes), the process is ended.

If reading is not completed (S740: No), the output command portion 49b stands by until a reading restart request is supplied from the CPU 11 (see FIGS. 20A and 20B) or reading is completed (S740, S750). If a reading restart request is supplied (S750: Yes), the value of the variable OFFSET set in the offset setting portion 49a is set to a variable wait_cnt (S760).

Thereafter, the output command portion 49b stands by until an edge detection signal is supplied (S770). If an edge detection signal is supplied (S770: Yes), it is determined whether the conveyed object has reached the reading restart reference position based on the value enc_cnt supplied from the position counter 33 at the time (S780). Particularly, it is determined whether the value enc_cnt supplied from the position counter 33 is consistent with the coordinate restart_position of the reading restart reference position set by the offset setting portion 49a (S780).

If the value enc_cnt supplied from the position counter 33 is not consistent with the coordinate restart_position of the reading restart reference position (S780: No), it is determined that the conveyed object has not reached the reading restart reference position. The output command portion 49b stands by until the value enc_cnt corresponds to the coordinate restart_position (S770, S780).

Figure 14:
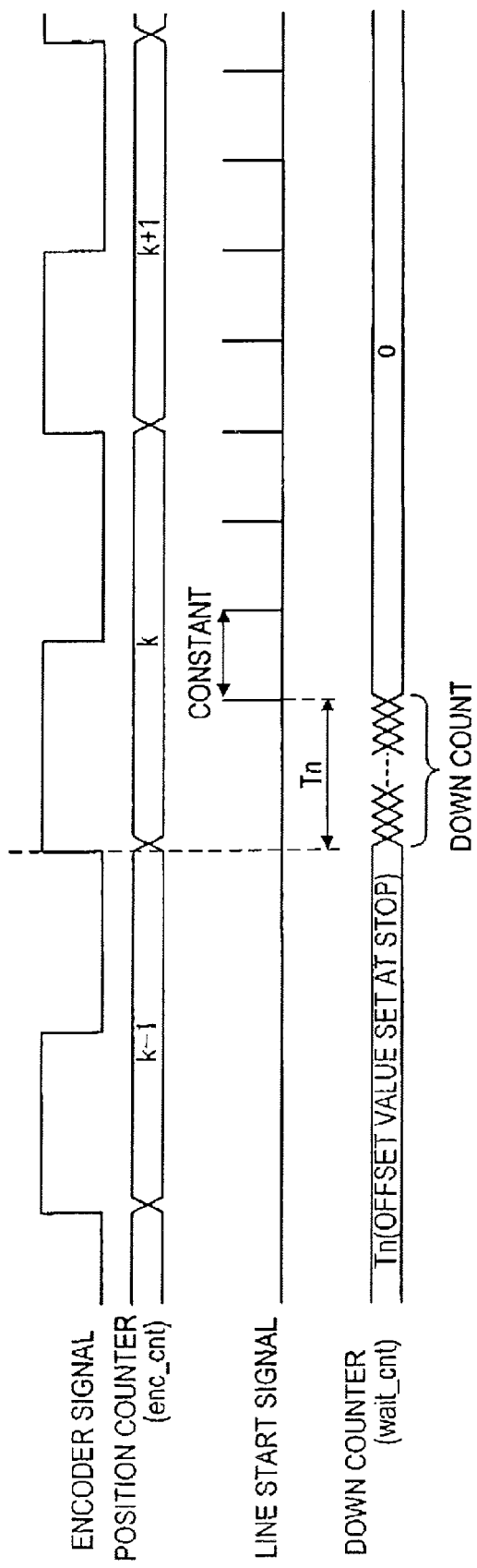
FIG. 14 is a time chart showing an output restart timing of a line start signal in the multifunction apparatus.

If the value enc_cnt supplied from the position counter 33 is consistent with the coordinate restart_position of the reading restart reference position (S780: Yes), it is determined that the conveyed object has reached the reading restart reference position. A line start output command is supplied to the reading front end 41 after the offset time (the variable OFFSET) set to the variable wait_cnt has elapsed (S790 to S800) FIG. 14 shows a timing when output of a line start signal is started from the reading front end 41 after a line start output command is supplied to the reading front end 41 at restart of reading.

Particularly, the output command portion 49b operates synchronously with a clock signal supplied from the clock generation unit 25. In S795, the variable wait_cnt is counted down at a cycle of the clock signal. Thereby, elapsed time is measured from when the conveyed object has reached the reading restart reference position. When the variable wait_cnt becomes 0 (S790: Yes), a line start output command is supplied to the reading front end 41 (S800).

As noted above, the output command portion 49b makes the CCD line sensor 20 resume reading operation from where the offset time has elapsed from a reading interruption point, that is, the reading restart reference position.

When the step of S800 is completed, the process moves to S740. The output command portion 49b stands by until a reading restart request is again supplied from the CPU 11 (see FIGS. 20A and 20B) or reading is completed. If reading is completed (S740: Yes), the process is ended.

(4) Details of Drive Control Unit 17

Figure 15:
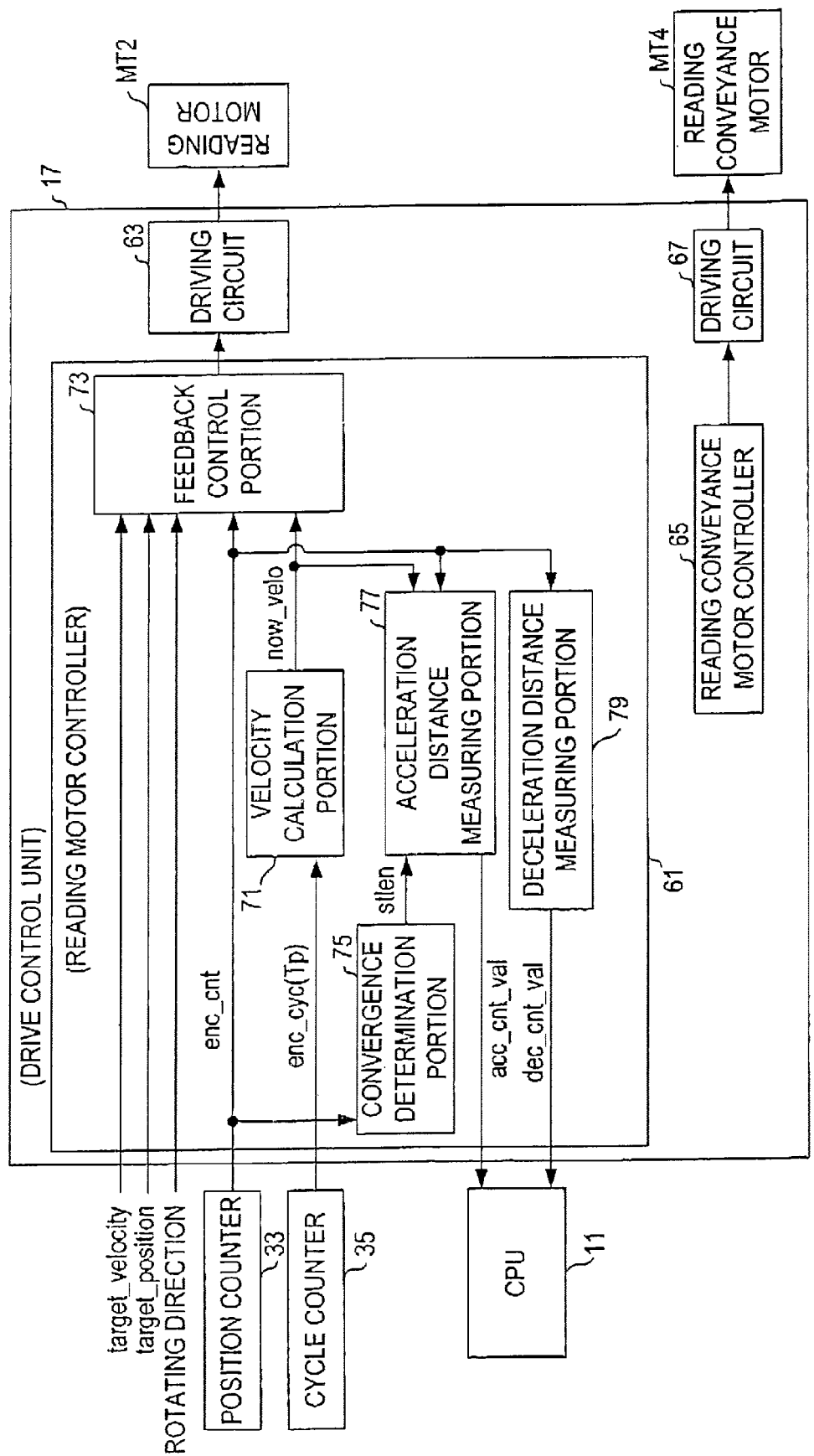
FIG. 15 is a block diagram showing a constitution of a drive control unit of the multifunction apparatus.

As shown in FIG. 15, the drive control unit 17 includes a reading motor controller 61, a reading conveyance motor controller 65, a not shown recording motor controller, and a not shown recording conveyance motor controller. The reading motor controller 61 controls the reading motor MT2 through a driving circuit 63. The reading conveyance motor controller 65 controls the reading conveyance motor MT4 through a driving circuit 67. The recording motor controller controls the recording motor MT1 through a not shown driving circuit. The recording conveyance motor controller controls the recording conveyance motor MT3 through a not shown driving circuit.

Each of the motor controllers controls the respective controlled motor MT1 to MT4 based on the outputs enc_cnt, enc_cyc and Tp from the position counter 33 and the cycle counter 35 corresponding to the encoder attached to the controlled motor.

Specifically, each of the reading motor controller 61 and the reading conveyance motor controller 65 includes a velocity calculation portion 71, a feedback control portion 73, a convergence determination portion 75, an acceleration distance measuring portion 77, and a deceleration distance measuring portion 79.

The reading conveyance motor controller 65 basically has the same constitution as the reading motor controller 61. The respective portions 71 to 79 of the reading conveyance motor controller 65 operate in the same manner as the respective portions of the reading motor controller 61. It should be noted, however, that the reading conveyance motor controller 65 controls the controlled motor MT4 based on the outputs enc_cnt, enc_cyc, and Tp from the position counter 33 and the cycle counter 35 corresponding to the encoder EN4 attached to the motor MT4.

(4.1) Details of Velocity Calculation Portion 71 and Feedback Control Portion 73

The velocity calculation portion 71 provided in the reading motor controller 61 calculates a value 1/Tp as a moving velocity now_velo of the conveyed object based on the value Tp supplied from the cycle counter 35. The calculated value 1/Tp is supplied to the feedback control portion 73 and the acceleration distance measuring portion 77.

The feedback control portion 73 controls the controlled motor MT2 based on the value enc_cnt supplied from the position counter 33 and the value 1/Tp supplied from the velocity calculation portion 71 to rotate the motor MT2 at a constant velocity.

Particularly, the feedback control portion 73, when receiving a motor driving command from the CPU 11, rotates the controlled motor MT2 in accordance with drive settings provided by the CPU 11. A rotating direction and a target velocity (target_velocity) of the motor are set by the CPU 11 before supply of a motor driving command. A target distance (target_position) is also set as required.

Specifically, when a motor driving command is received, the feedback control portion 73 rotates the motor MT2 to the rotating direction set by the CPU 11 to perform feedback control so that the moving velocity of the conveyed object (corresponding to the rotation velocity of the motor) reaches the target velocity set by the CPU 11. As a result of such operation by the feedback control portion 73, the conveyed object passes an acceleration section to be shifted into a constant velocity moving state (see FIG. 22).

When the target distance is set, the feedback control portion 73 performs a deceleration and stop process for the motor MT2 before the moving distance of the conveyed object since receipt of the motor driving command reaches the target distance. The motor MT2 is controlled to stop the conveyed object when the moving distance of the conveyed object reaches the target distance.

Also, when a motor deceleration and stop command is received from the CPU 11, the feedback control portion 73 starts the deceleration and stop process for the motor MT2. Rotation of the motor MT2 is stopped to stop the conveyed object.

As noted above, the feedback control portion 73 controls the kinetic state of the motor MT2 (and kinetic state of the conveyed object) according to the command from the CPU 11.

(4.2) Details of Convergence Determination Portion 75

The convergence determination portion 75 of the present embodiment supplies a stlen signal as a convergence determination signal to the acceleration distance measuring portion 77 at all times. When a process execution command is received from the CPU 11 during the execution of a reading control process by the CPU 11 (see FIGS. 20A and 20B), the convergence determination portion 75 starts a convergence determination process shown in FIG. 16 to switch the state of the stlen signal.

Figure 16:
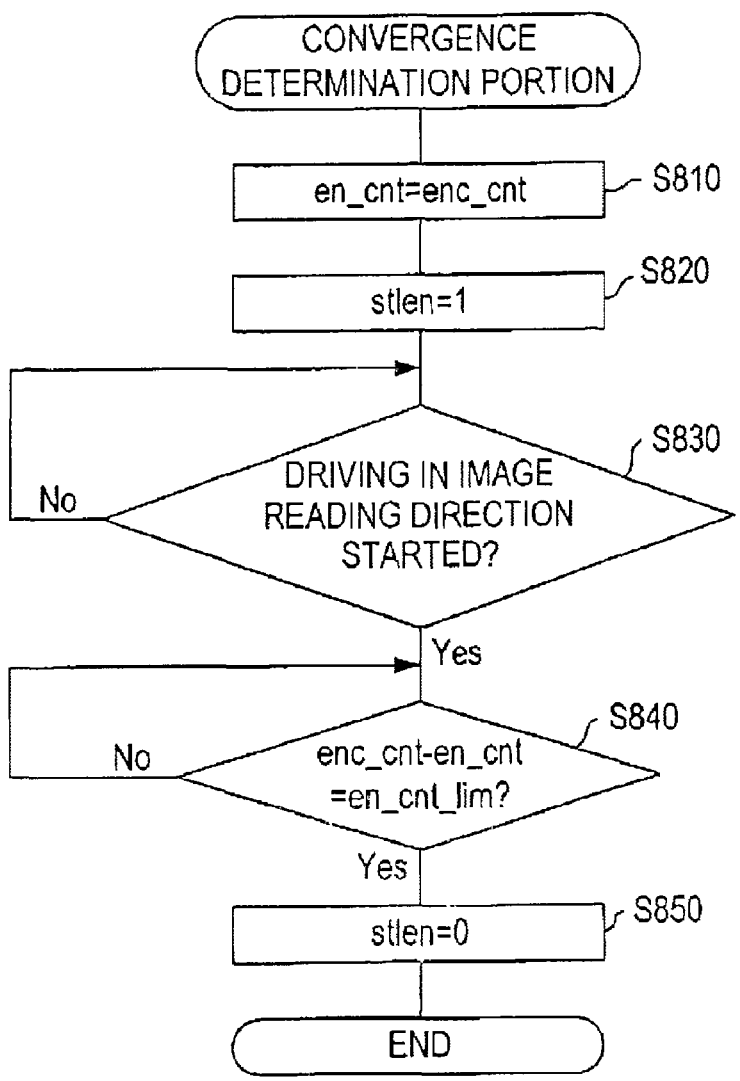
FIG. 16 is a flowchart showing a convergence determination process performed by a convergence determination portion of the multifunction apparatus.

As shown in FIG. 16, when the convergence determination process is started, the convergence determination portion 75 sets the current output value enc_cnt received from the position counter 33 to a variable en_cnt (S810). A logical value of the stlen signal is set to 1 (S820).

Subsequently, the convergence determination portion 75 stands by until a motor driving command indicating motor drive in the image reading direction is supplied from the CPU 11 to the reading motor controller 61 by a later explained step of S1220 (S830). When a motor driving command is supplied (S830: Yes), the convergence determination portion 75 stands by until the conveyed object is moved by a predetermined distance by operation of the motor MT2 based on the motor driving command (S840).

Particularly, subtraction of the variable en_cnt from the output value enc_cnt received from the position counter 33 is repeatedly performed. The convergence determination portion 75 stands by until the calculation result Δd=enc_cnt−en_cnt is equal to a threshold en_cnt_lim (S840).

When the conveyed object is moved by the predetermined distance and Δd=en_cnt_lim (S840: Yes), the logical value of the stlen signal is set to 0 (S850). The convergence determination process is ended.

In this manner, the convergence determination portion 75 outputs the stlen signal having a logical value of 1 during a period from when a process execution command is supplied from the CPU 11 until the conveyed object is moved by the predetermined distance. During the other period, the stlen signal having a logical value of 0 is outputted.

The acceleration distance measuring portion 77 which receives the stlen signal operates as below.

(4.3) Details of Acceleration Distance Measuring Portion 77

Figure 17:
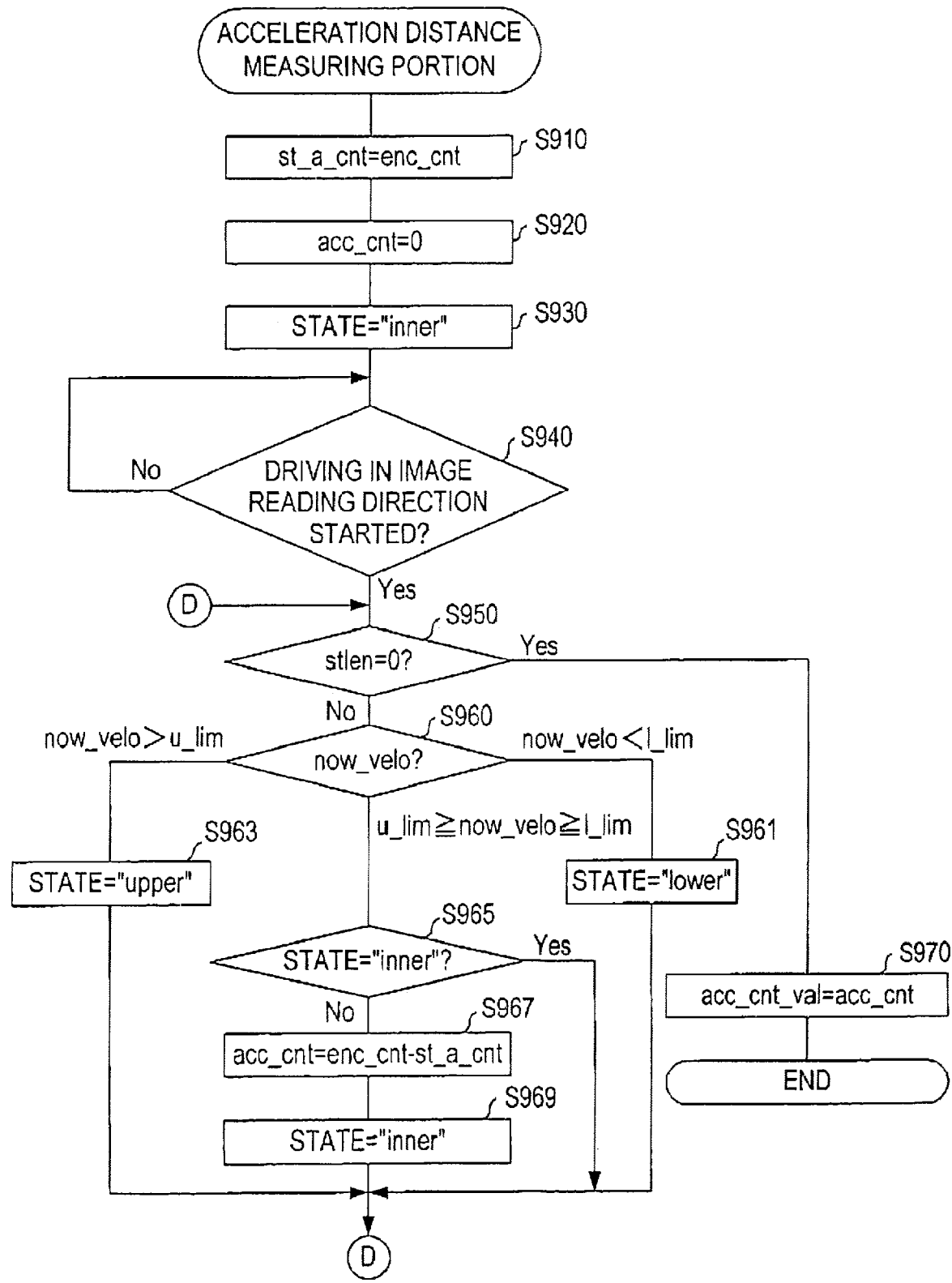
FIG. 17 is a flowchart showing an acceleration distance measuring process performed by an acceleration distance measuring portion of the multifunction apparatus.

The acceleration distance measuring portion 77 performs an acceleration distance measuring process shown in FIG. 17 when a process execution command is received from the CPU 11. In the acceleration distance measuring process, the acceleration distance measuring portion 77 updates the value of a variable acc_cnt_val stored in a register of the drive control unit 17 thereby to notify the CPU 11, through the register, of an acceleration distance as a moving distance required for the conveyed object to be shifted from the stopped state to the constant velocity moving state.

As shown in FIG. 17, when the acceleration distance measuring process is started upon receipt of a process execution command, the acceleration distance measuring portion 77 sets the current output value enc_cnt received from the position counter 33 to a variable st_a_cnt (S910). A variable acc_cnt is set to 0 (S920). A value "inner" is set to a variable STATE (S930).

Subsequently, the acceleration distance measuring portion 77 stands by until a motor driving command indicating motor drive in the image reading direction is supplied from the CPU 11 to the reading motor controller 61 by the later explained step of S1220 (S940). When a motor driving command is supplied (S940: Yes), the steps from S950 to S969 are repeatedly performed until the logical value of the stlen signal supplied from the convergence determination portion 75 is changed from 1 to 0.

Specifically, the acceleration distance measuring portion 77 sets a value "lower" to the variable STATE if the value now_velo supplied from the velocity calculation portion 71 is lower than a predetermined lower limit l_lim (now_velo<l_lim) (S961). The acceleration distance measuring portion 77 sets a value "upper" to the variable STATE if the value now_velo supplied from the velocity calculation portion 71 is higher than a predetermined upper limit u_lim (now_velo>u_lim) (S963).

The acceleration distance measuring portion 77 also determines whether the current value of the variable STATE is the value "inner" when the value now_velo supplied from the velocity calculation portion 71 is within a range between the lower limit l_lim and the upper limit u_lim (l_lim≦now_velo≦u_lim) (S965). If the current value of the variable state is not the value "inner" (S965: No), the variable acc_cnt is set to a value obtained by subtracting the variable st_a_cnt from the current output value enc_cnt received from the position counter 33 as shown in equation (i) below (S967).

$$acc\_cnt = enc\_cnt - st\_a\_cnt \quad \text{(i)}$$

Subsequently, the acceleration distance measuring portion 77 changes the value of the variable STATE to the value "inner" (S969). When the current value of the variable STATE is the value "inner" (S965: Yes), the value "inner" is retained in the variable STATE without performing the steps of S967 and S969.

The acceleration distance measuring portion 77 repeatedly performs the above process until the logical value of the stlen signal supplied from the convergence determination portion 75 is changed from 1 to 0.

In the present embodiment, the upper limit u_lim is set larger than the target velocity set to the reading motor controller 61 (particularly, the feedback control portion 73). The lower limit l_lim is set smaller than the target velocity.

Particularly, in the present embodiment, each time the target velocity is set by the CPU 11, the upper limit u_lim and the lower limit l_lim are set in the reading motor controller 61 as equations (ii) and (iii) below.

$$u\_lim = \text{target velocity} + \Delta lim \quad \text{(ii)}$$

$$l\_lim = \text{target velocity} - \Delta lim \quad \text{(iii)}$$

Δlim is a value predetermined at design stage. The upper limit u_lim and the lower limit l_lim may be individually set by the CPU 11 when the target velocity is set.

When the logical value of the stlen signal supplied from the convergence determination portion 75 is changed from 1 to 0 (S950: Yes), the acceleration distance measuring portion 77 updates the value of the variable acc_cnt_val to the current value of the variable acc_cnt (S970). The acceleration distance measuring process is ended.

Figure 18:
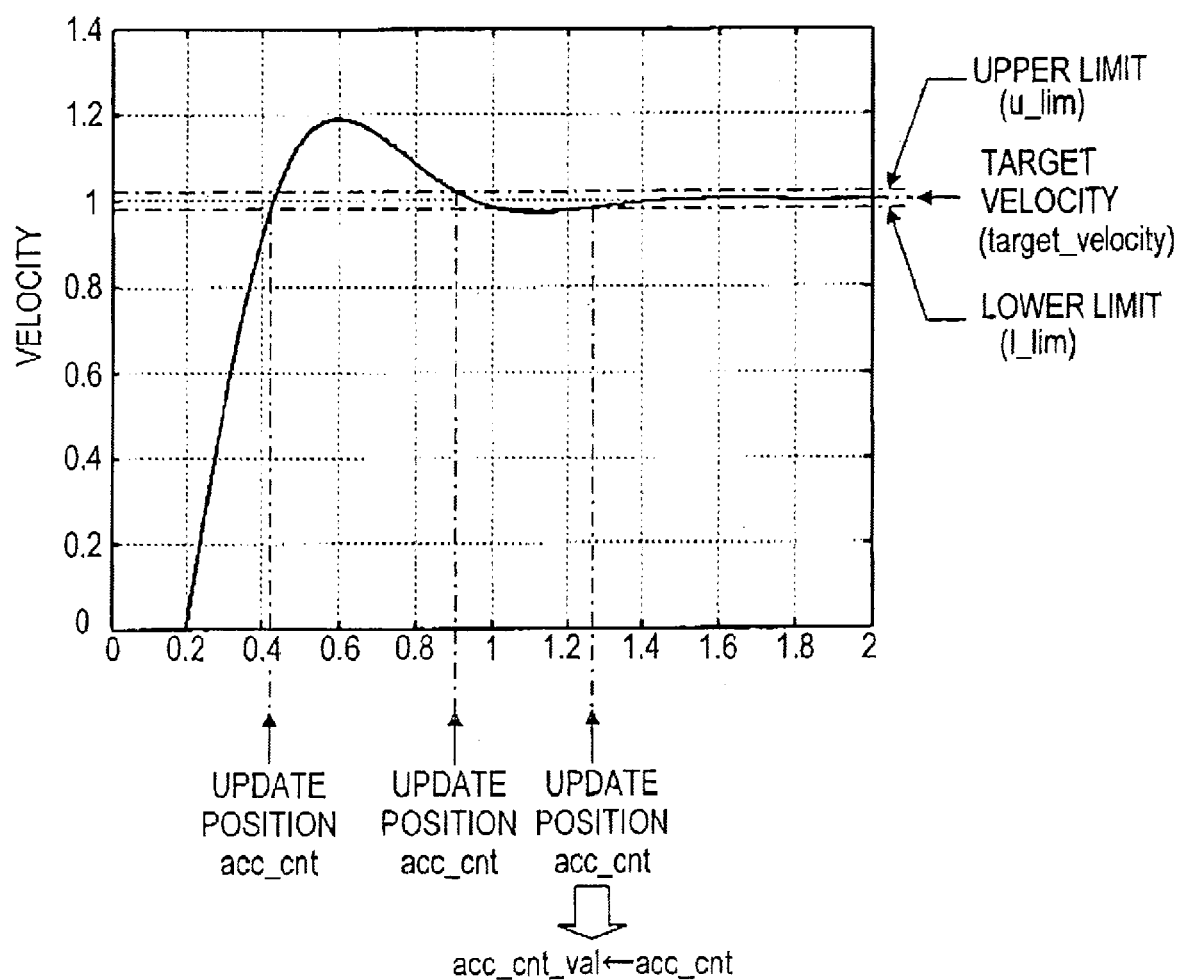
FIG. 18 is a graph showing change in velocity of a conveyed object and a relationship among a target velocity, an upper limit u_lim and a lower limit l_lim, in the multifunction apparatus.

Specifically, as shown in FIG. 18, the acceleration distance measuring portion 77 updates the value of the variable acc_cnt each time an event occurs that the value 1/Tp indicating the velocity of the conveyed object, supplied from the velocity calculation portion 71, is converged into the range between the upper limit u_lim set higher than the target velocity and the lower limit l_lim set lower than the target velocity, from outside the range. The acceleration distance measuring portion 77 sets a distance until the above event has lastly occurred in a predetermined period of time (the period during which the logical value of the stlen signal is 1) as an acceleration distance, to the variable acc_cnt val.

(4.4) Details of Deceleration Distance Measuring Portion 79

Figure 19:
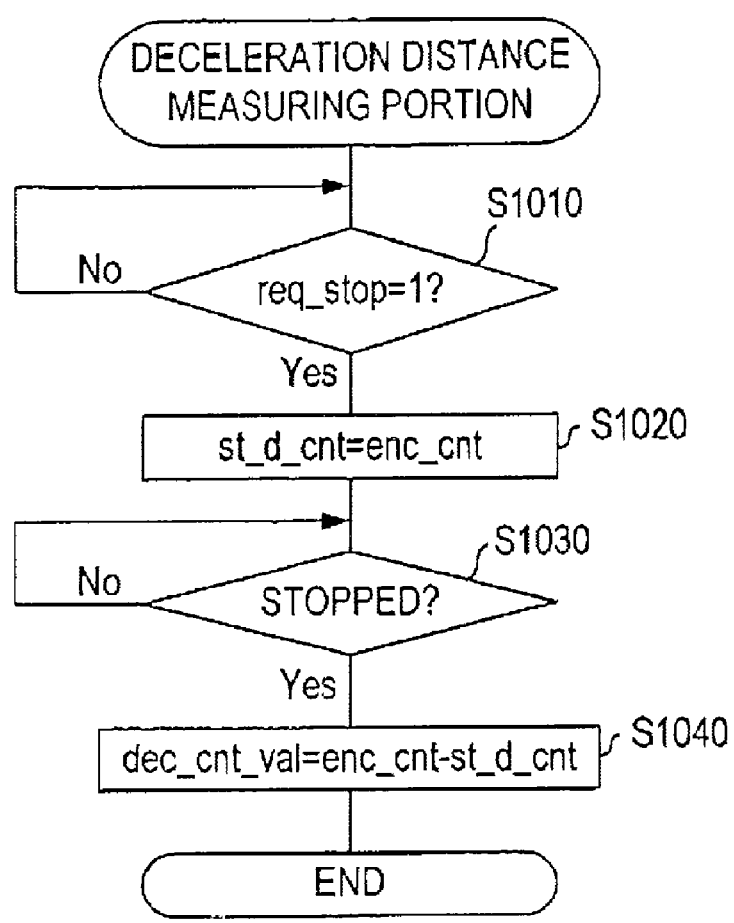
FIG. 19 is a flowchart showing a deceleration distance measuring process performed by a deceleration distance measuring portion of the multifunction apparatus.

The deceleration distance measuring portion 79 performs a deceleration distance measuring process shown in FIG. 19 when a process execution command is received from the CPU 11.

In the deceleration distance measuring process, the deceleration distance measuring portion 79 updates the value of a variable dec_cnt_val stored in the register of the drive control unit 17 thereby to notify the CPU 11, through the register, of a deceleration distance as a moving distance required for the conveyed object to be moved from interruption of reading operation by the CCD line sensor 20 until stop of the conveyed object.

As shown in FIG. 19, when the deceleration distance measuring process is started, the deceleration distance measuring portion 79 stands by until the logical value of the req_stop signal supplied from the reading control unit 21 is changed from 0 to 1 (S1010). When the logical value of the req_stop signal is changed from 0 to 1 (S1010: Yes), the current output value enc_cnt received from the position counter 33 is set to a variable st_d_cnt (S1020).

Thereafter, the deceleration and stop process for the motor MT2 is performed by the feedback control portion 73. The deceleration distance measuring portion 79 stands by until rotation of the controlled motor MT2 is stopped (i.e., until the conveyed object is stopped) (S1030). Whether or not rotation of the motor MT2 is stopped is determined by determining whether or not the output value of the position counter 33 has no longer changed.

When rotation of the motor MT 2 is stopped (S1030: Yes), the deceleration distance measuring portion 79 updates the value of the variable dec_cnt_val to a value obtained by subtracting the value of the variable st_d_cnt from the current output value enc_cnt received from the position counter 33 as shown in equation (iv) below (S1040).

$$dec\_cnt\_val = enc\_cnt - st\_d\_cnt \quad \text{(iv)}$$

Thereafter, the deceleration distance measuring process is ended.

Specifically, the deceleration distance measuring portion 79 measures a moving distance of the conveyed object from when the logical value of the req_stop signal is changed from 0 to 1 until rotation of the motor MT2 is stopped, thereby to measure a deceleration distance. The measured deceleration distance is set to the variable dec_cnt_val. Upon execution of the step of S1040, the CPU 11 is notified that rotation of the motor MT2 is stopped.

(5) Details of Reading Control Process Performed by CPU 11

Figure 20A:
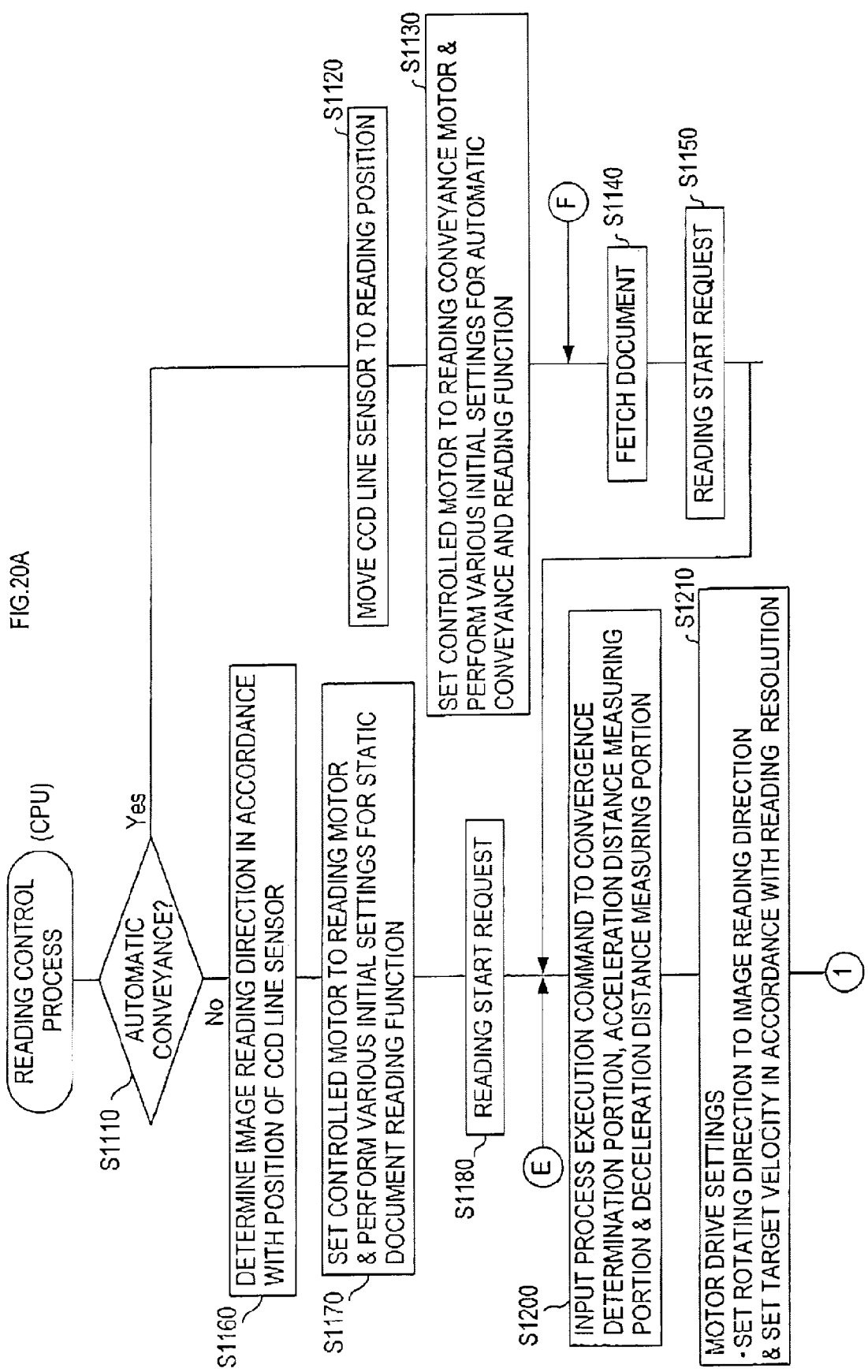
FIG. 20A is a flowchart showing a first half of a reading control process executed by a CPU of the multifunction apparatus.

The CPU 11 starts the reading control process shown in FIGS. 20A and 20B based on a program stored in the ROM 13 when a reading key of the display operation panel 23 is depressed.

As shown in FIGS. 20A and 20B, when the reading control process is started, the CPU 11 determines whether a command supplied from a user by depression of the reading key is for operation of the automatic conveyance and reading function (S1110). Particularly, if the reading key is depressed in a state that a document is placed on the document tray 165, it is determined that the command supplied from the user is for operation of the automatic conveyance and reading function. Otherwise, it is determined that the command supplied from the user is not for operation of the automatic conveyance and reading function (that is, operation for the static document reading function).

When it is determined that the command supplied from the user is for operation of the automatic conveyance and reading function (S1110: Yes), the process moves to S1120. When it is determined that the command supplied from the user is not for operation of the automatic conveyance and reading function (S1110: No), the process moves to S1160.

In S1120, the CPU 11 moves the CCD line sensor 20 to the home position as a reading position during operation of the automatic conveyance and reading function, through the drive control unit 17. Thereafter, the reading conveyance motor MT4 is set as the controlled motor, and various initial settings are performed in order to achieve the automatic conveyance and reading function (S1130). Particularly, the outputs of the encoder edge detection unit 31 and the position counter 33 for the reading conveyance motor MT4 are set to be supplied to the reading control unit 21. Also, the reading start position start_position, etc. are set.

After the step of S1130, the CPU 11 fetches the document placed on the document tray 165 through the ADF device 150 to be so arranged that the front end of the document may be located at a fetch complete position (S1140). Thereafter, a reading start request is supplied to the reading control unit 21 (S1150). The process moves to S1200.

On the other hand, in S1160, the CPU 11 determines the image reading direction in accordance with the current position of the CCD line sensor 20. Particularly, if the current position of the CCD line sensor 20 is the home position, the image reading direction is determined to be a direction starting from the home position and ending at an end point opposite to the home position. In the present embodiment, when the motor rotates in a forward direction, the CCD line sensor 20 is moved in this direction (moving away from the home position).

When the current position of the CCD line sensor 20 is the end point opposite to the home position, the image reading direction is determined to be a direction starting from the end point opposite to the home position and ending at the home position. In the present embodiment, when the motor rotates in a reverse direction, the CCD line sensor 20 is moved in this direction (approaching the home position).

Thereafter, the CPU 11 sets the controlled motor to the reading motor MT2, and various initial settings are performed in order to achieve the static document reading function (S1170). Particularly, the outputs of the encoder edge detection unit 31 and the position counter 33 for the reading motor MT2 are set to be supplied to the reading control unit 21. Also, the reading start position start_position, etc. are set.

After the step of S1170, the CPU 11 supplies a reading start request to the reading control unit 21 (S1180). The process moves to S1200.

In S1200, the CPU 11 supplies a process execution command to the convergence determination portion 75, the acceleration distance measuring portion 77 and the deceleration distance measuring portion 79, associated with the motor controller of the drive control unit 17 corresponding to the controlled motor. Then, motor drive settings are performed in the feedback control portion 73 of the motor controller (S1210).

Specifically, when the controlled motor is the reading motor MT2, a process execution command is supplied to the reading motor controller 61 to perform motor drive settings. When the controlled motor is the reading conveyance motor MT4, a process execution command is supplied to the reading conveyance motor controller 65 to perform motor drive settings (S1200, S1210). Particularly, as the motor drive settings, the motor rotating direction is set to the rotating direction corresponding to the image reading direction. Moreover, the target velocity is set in accordance with reading resolution preset by the user. In the case of achieving the automatic conveyance and reading function, the motor rotating direction is set to the forward direction in S1210.

After the step of S1210, the CPU 11 supplies a motor driving command to the motor controller (reading motor controller 61 or reading conveyance motor controller 65) corresponding to the controlled motor to make the motor controller perform conveyance of the conveyed object (S1220).

After the step of S1220, the CPU 11 determines whether reading of the read object is completed (whether a reading complete signal is outputted from the reading control unit 21) (S1230). If reading is not completed (S1230: No), the CPU 11 stands by until reading of the read object is completed or the logical value of the req_stop signal is changed from 0 to 1 in the reading control unit 21 (S1230, S1240). When the logical value of the req_stop signal is changed from 0 to 1 (S1240: Yes), a motor deceleration and stop command is supplied to the motor controller corresponding to the controlled motor to stop rotation of the controlled motor and movement of the conveyed object (S1250).

After the step of S1250, the CPU 11 stands by until rotation of the controlled motor is stopped (S1260). When the rotation is stopped (S1260: Yes), information of the acceleration distance acc_cnt_val and the deceleration distance dec_cnt_val measured in the motor controller corresponding to the controlled motor is obtained from the motor controller (S1270). A value D, that is, a sum of the obtained acceleration distance acc_cnt_val and deceleration distance dec_cnt_val is calculated as shown in equation (v) below (S1280).

$$D = acc\_cnt\_val + dec\_cnt\_val \qquad (v)$$

Thereafter, the CPU 11 performs motor drive settings in the feedback control portion 73 of the motor controller corresponding to the controlled motor. Here, as the motor drive settings, the motor rotating direction is set reverse to the rotating direction corresponding to the image reading direction, the target velocity is set to a predetermined value, and the target distance is set as the value D calculated in S1280 (S1290). Thereafter, the motor driving command is supplied to the feedback control portion 73 of the motor controller corresponding to the controlled motor to set back the conveyed object from the stopped position by a distance corresponding to the value D (S1300).

Thereafter, the CPU 11 stands by until rotation of the controlled motor is stopped (S1310). When the rotation is stopped (S1310: Yes), the CPU 11 stands by until the logical value of the restart_sig signal outputted from the reading control unit 21 is changed from 0 to 1 (S1320). When the logical value of the restart_sig signal is changed from 0 to 1 (S1320: Yes), a reading restart request is supplied to the reading control unit 21 (S1330). The process moves to S1200.

In S1220, a process execution command is supplied to the motor controller corresponding to the controlled motor. After the motor drive settings are performed (S1210), a motor driving command is supplied to the motor controller (S1220). The conveyed object is moved in the image reading direction to resume reading operation by the CCD line sensor 20 from the reading interruption point.

When reading of the read object is completed (S1230: Yes), the CPU 11 determines whether the user command which has triggered execution of the reading control process is to activate the automatic conveyance and reading function (S1340). If the user command is to activate the automatic conveyance and reading function (S1340: Yes), the read document is discharged onto the discharge tray 166 through the drive control unit 17 (S1350). If the next document is placed on the document tray 165 (S1360: Yes), the process moves to S1140 to fetch the next document. After the step of S1150, the steps of S1200 onwards are executed again.

If the next document is not placed on the document tray 165 (S1360: No), the reading control process is ended.

If the user command which has triggered execution of the reading control process is not to activate the automatic conveyance and reading function (S1340: No), the CCD line sensor 20 is moved to a terminal in the image reading direction (the end point opposite to the home position or the home position) through the drive control unit 17 (S1370). The reading control process is ended.

Figure 21:
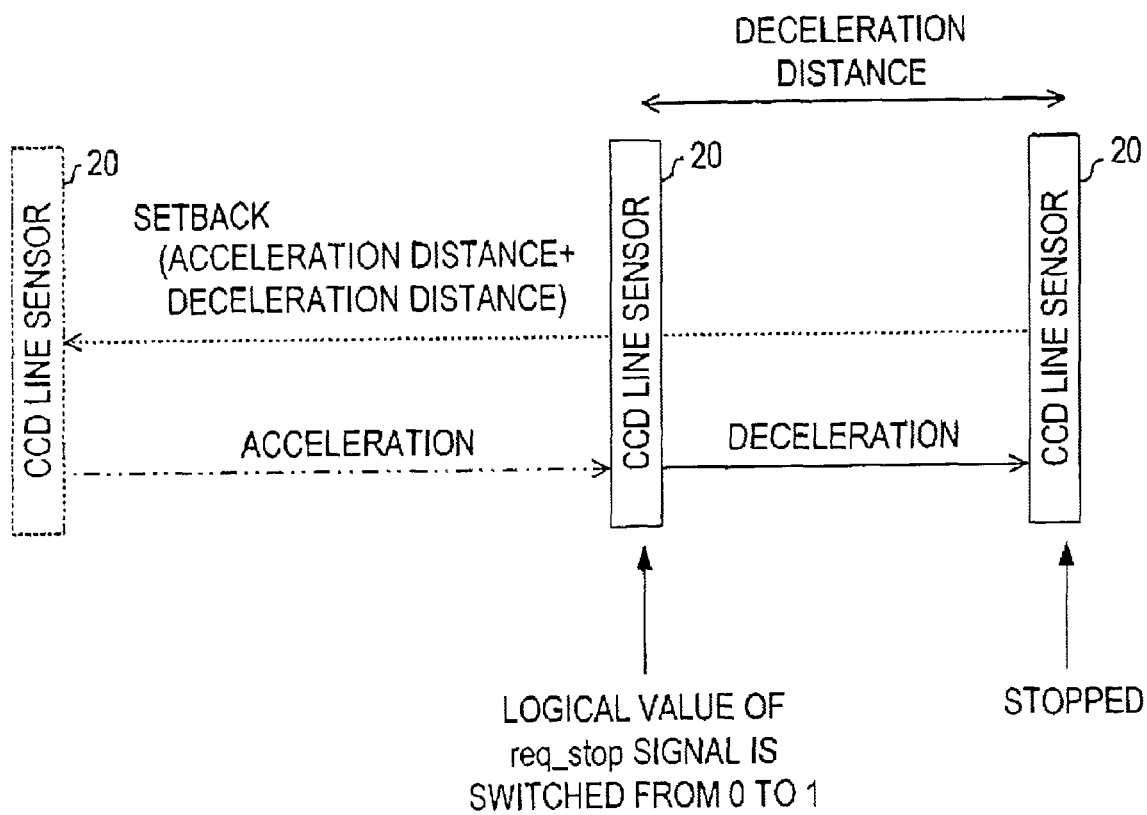
FIG. 21 is an explanatory view illustrating how to set a setback distance in the multifunction apparatus.

As noted above, when reading operation by the CCD line sensor 20 has to be temporarily interrupted, the CPU 11 sets back the conveyed object to the side opposite to the image reading direction by the distance D, that is, the sum of the deceleration distance dec_cnt_val and the acceleration distance acc_cnt_val. The deceleration distance is a distance by which the conveyed object is moved from interruption of reading operation by the CCD line sensor 20 until stop of the conveyed object. The acceleration distance is a distance necessary to shift the conveyed object from a stopped state to a constant-velocity state. At restart of reading, the CPU 11 then moves the conveyed object to the reading interruption point in an efficient manner to promptly resume reading operation by the CCD line sensor 20. FIG. 21 is an explanatory view illustrating how to set the setback distance in the present embodiment.

(6) Effects

In the multifunction apparatus 1 according to the present embodiment, the drive control unit 17 controls the moving velocity of the conveyed object, and moves the conveyed object in the image reading direction at a constant velocity. From when the conveyed object has passed the reading start position (start_position), the reading control unit 21 writes reading image data for each line generated by reading operation of the CCD line sensor 20 into the buffer 45a. Also, in the multifunction apparatus 1, the acceleration distance measurement portion 77 measures a distance (acceleration distance) from where the conveyed object has started to move to where the conveyed object has shifted into a state of constant move.

Furthermore, in the multifunction apparatus 1, when it is determined by the image data processing unit 43 that the process related to reading needs to be interrupted, the logical value of the stop_sig signal is changed from 0 to 1 to stop operation of the reading front end 41. Also, deceleration and stop control for the motor is performed by the drive control unit 17. In the drive control unit 17, the deceleration distance measurement portion 79 measures the moving distance (deceleration distance) of the conveyed object from the reading stop position until stop of move in the image reading direction.

Also in the multifunction apparatus 1, when it is determined that interruption of the process related to reading is necessary, the drive control unit 17 stops the conveyed object. Then, the conveyed object is moved in a direction opposite to the image reading direction. The distance to move the conveyed object (setback distance) is set to the sum of the acceleration distance and the deceleration distance.

If reading is restarted from the reading interruption point, it is necessary to shift the conveyed object to a constant-velocity moving state before the conveyed object passes the reading interruption point (reading resumption point).

Accordingly, as in the present embodiment, if the setback distance is determined based on actual measurements of the acceleration distance and the deceleration distance, there is no necessity to consider deterioration with age in transfer characteristics of the conveying mechanism and preset the needlessly long setback distance. The conveyed object can be set back by a proper distance at interruption of reading.

Figure 22:
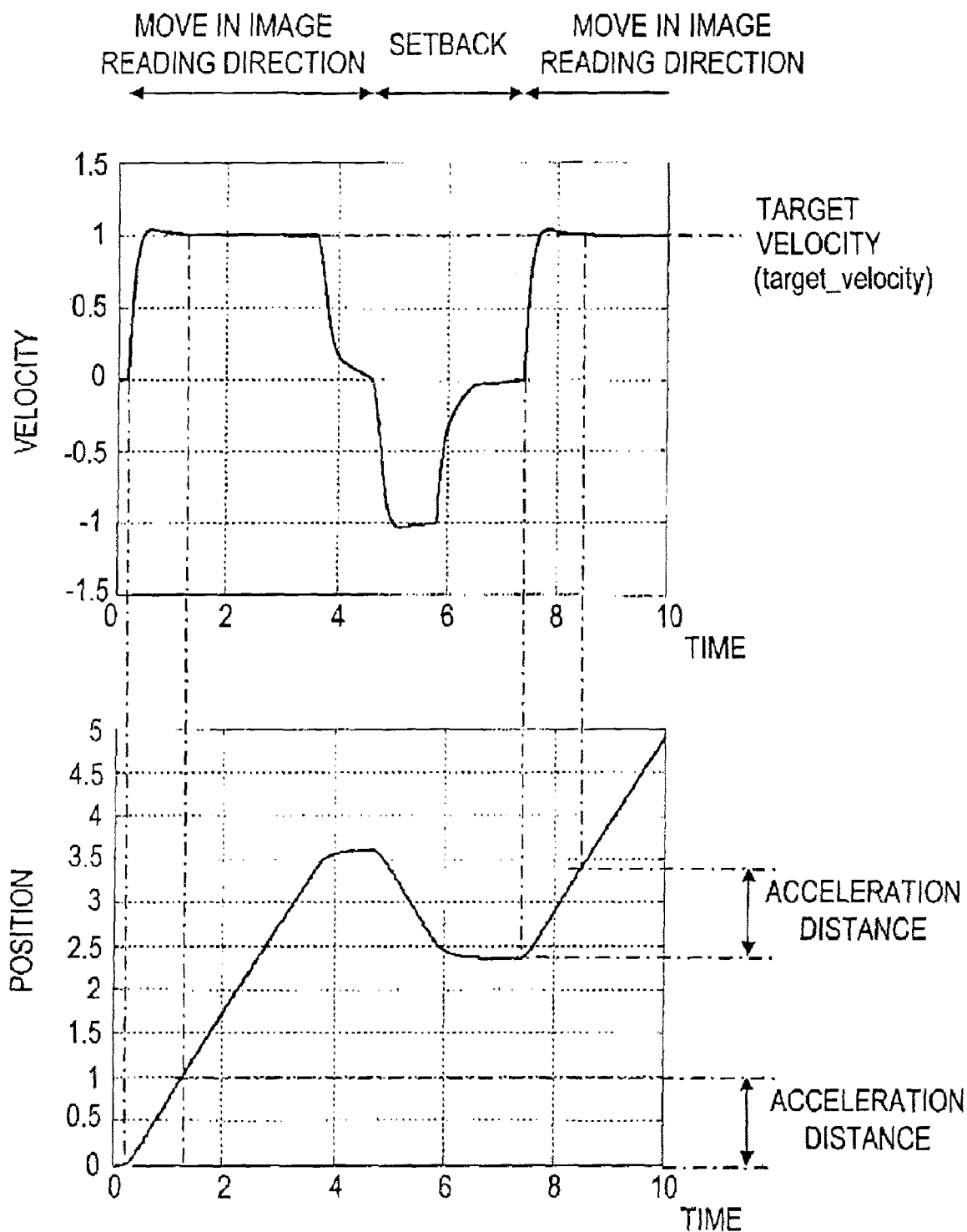
FIG. 22 shows graphs relating to change in velocity and position of a CCD line sensor of the multifunction apparatus.
Figure 23:
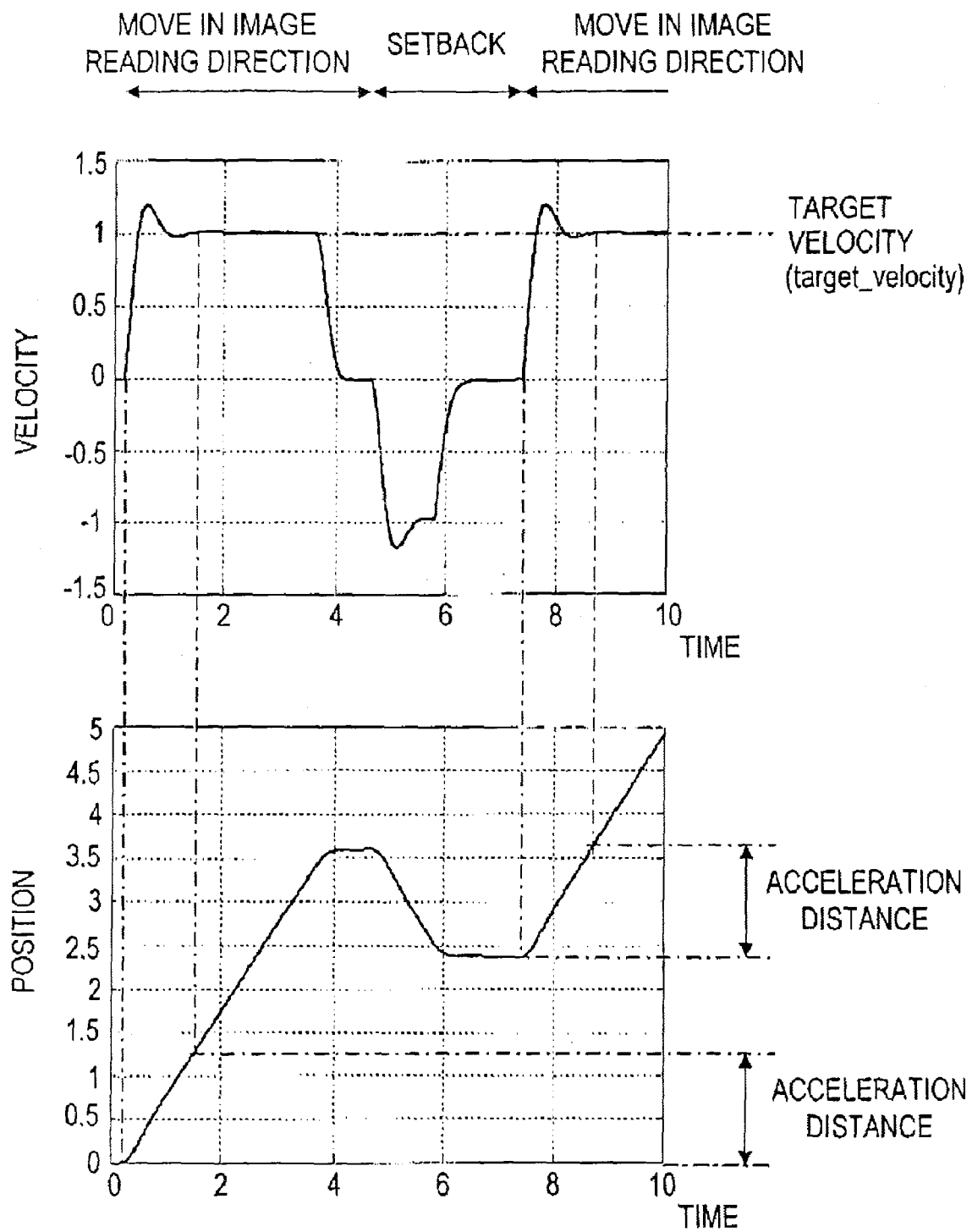
FIG. 23 shows graphs relating to change in velocity and position of the CCD line sensor of the multifunction apparatus.

For example, at manufacturing of the multifunction apparatus 1, the moving velocity of the CCD line sensor 20 may be changed as shown in FIG. 22 by operation of the feedback control portion 73. However, when time passes, friction, etc. in the conveyed mechanism of the CCD line sensor 20 may become high, for example. As shown in FIG. 23, there are cases in which it takes longer until the CCD line sensor 20 is stabilized at the target velocity.

FIGS. 22 and 23 show moving states of the CCD line sensor 20 under the following conditions. That is, the CCD line sensor 20 is moved in the image reading direction through the feedback control portion 73, and the deceleration and stop process is performed when the CCD line sensor 20 is stabilized in a constant-velocity state. The CCD line sensor 20 is set back in a direction opposite to the image reading direction when the CCD line sensor 20 has stopped. When setback is ended, the CCD line sensor 20 is moved again in the image reading direction. The upper graph in each figure shows temporal change in the moving velocity of the CCD line sensor 20. The lower graph shows temporal change in the position of the CCD line sensor 20 when change in velocity is observed in the upper graph of the respective figure. The graphs shown in FIG. 23 indicate the moving states of the CCD line sensor 20 in the multifunction apparatus 1 when the multifunction apparatus 1 has been deteriorated with age since the observed point in FIG. 22.

As noted above, the transfer characteristics of the conveyed object will be changed as the time elapses. Therefore, in the conventional apparatus having a fixed setback distance in the state shown in FIG. 22, it is necessary to determine the setback distance in consideration of prolongation of the acceleration distance as shown in FIG. 23 as time passes. However, according to the multifunction apparatus 1 of the present embodiment, the setback distance is set based on the last actual measurements of the acceleration distance and the deceleration distance. Thus, it is not necessary to set the needlessly long setback distance. Only the distance necessary and sufficient to shift the CCD line sensor 20 to a constant-velocity moving state at the reading interruption point (reading resumption point) can be set to set back the CCD line sensor 20.

Accordingly, in the multifunction apparatus 1, prolongation of time required for conveying the conveyed object to the reading resumption point is inhibited at restart of reading, and unnecessary increase can be also inhibited in power consumption for conveyance to the reading resumption point, due to needlessly long setback distance of the conveyed object. That is, the multifunction apparatus 1 allows efficient performance of reading restart operation.

Especially, the technique of the present embodiment allows efficient setback of the conveyed object. Thus, even if a product is manufactured at low cost by minimizing the capacity of a buffer, time until completion of reading a sheet of document can be kept sufficiently short. The inexpensive and high-performance multifunction apparatus 1 can be provided.

According to the present embodiment, the setback distance is determined based on the up-to-date measurement results of the acceleration distance and deceleration distance. Thus, the setback distance can be appropriately set as compared to an apparatus which sets the setback distance per predetermined time. For example, the transfer characteristics of the conveying mechanism are changed even by temperature change. There is possibility that the transfer characteristics may be changed between immediately after power-on of the multifunction apparatus 1 and after a while from power-on. According to the present embodiment, even such short-time change in transfer characteristics can be taken care of to set an appropriate setback distance.

In the multifunction apparatus 1 of the present embodiment, the CCD line sensor 20 is moved from the home position to the end point in the image reading direction at operation of the static document reading function. During the move, reading operation of a document is performed by the CCD line sensor 20. If the CCD line sensor 20 is moved to an end point opposite to the home position as a result of this operation, the image reading direction is reversed so as to read the next document from a direction opposite to the previous image reading direction. When interruption of reading operation is necessary and the CCD line sensor 20 is set back to the side opposite to the image reading direction, the setback distance is determined based on the acceleration distance and the deceleration distance lastly measured when the CCD line sensor 20 has been conveyed in the same direction as the current image reading direction.

The transfer characteristics of the conveying mechanism are changed even by the moving direction of the CCD line sensor 20. However, in the present embodiment, the setback distance is determined based on the acceleration distance and the deceleration distance measured when the image reading direction is the same as the current image reading direction. Thus, even when the image reading direction is reversed and the transfer characteristics of the transfer mechanism are changed, an appropriate setback distance can be set regardless of the change. According to the present embodiment, the high-performance multifunction apparatus 1 can be manufactured.

The present invention is not limited to the above described embodiment, and can be practiced in various manners without departing from the technical scope of the invention. For instance, the convergence determination portion 75 may be so constituted as to perform a convergence determination process shown in FIG. 24, instead of the convergence determination process shown in FIG. 16.

(7) Variation

Figure 24:
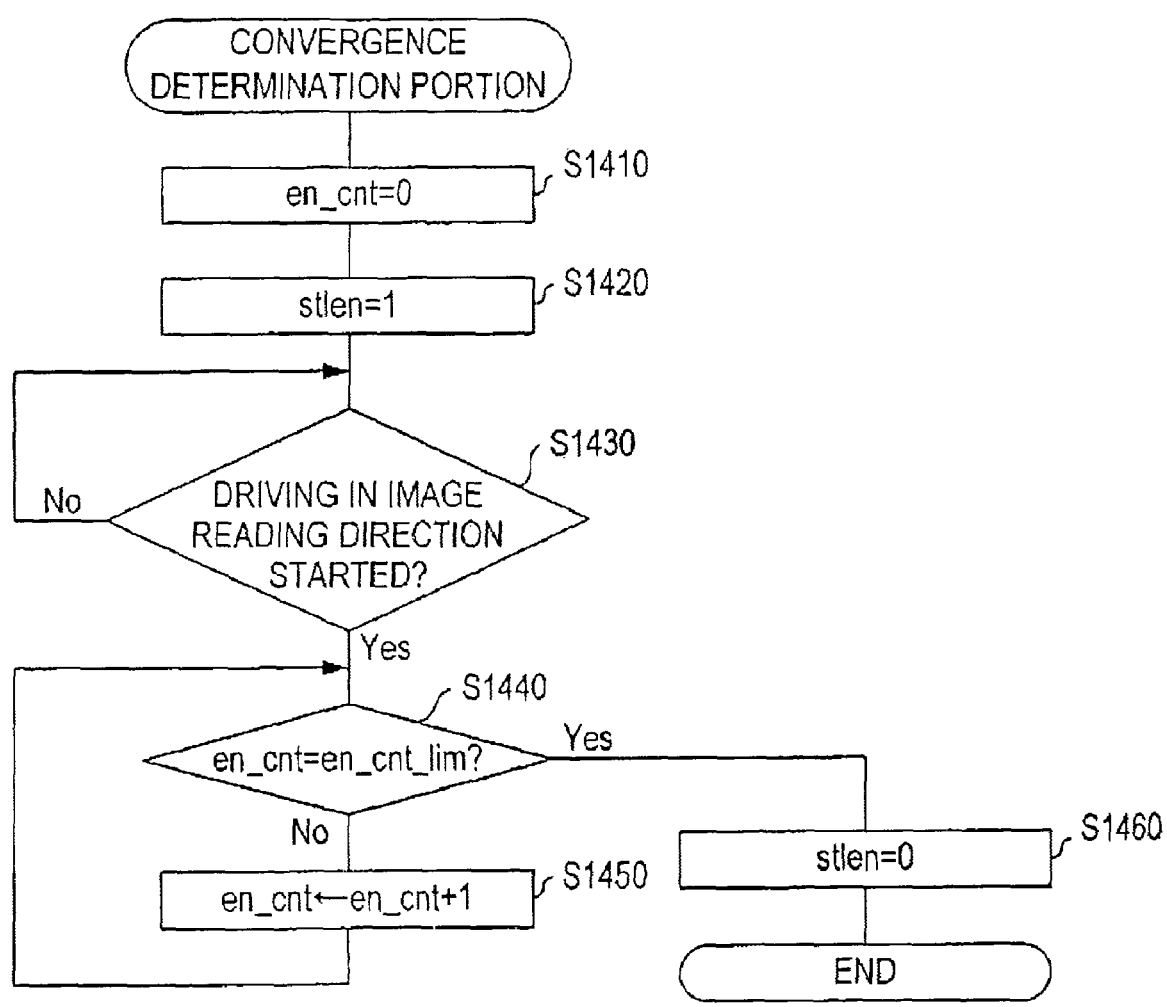
FIG. 24 is a flowchart showing a convergence determination process in a variation performed by the convergence determination unit.

The multifunction apparatus 1 in a variation has basically the same constitution as in the above embodiment, except that convergence determination process shown in FIG. 24, instead of the convergence determination process shown in FIG. 16, is performed by the convergence determination portion 75. Therefore, only the convergence determination process shown in FIG. 24 will be described hereafter.

As in the above embodiment, the convergence determination portion 75 is designed to supply a stlen signal as a convergence determination signal to the acceleration distance measurement portion 77 at all times. Upon receipt of a process execution command from the CPU 11, the convergence determination portion 75 performs the convergence determination process shown in FIG. 24 to switch a state of the stlen signal.

As shown in FIG. 24, when the convergence determination process is started by the convergence determination portion 75, the variable en_cnt is set to 0 (S1410). The logical value of the stlen signal is set to 1 (S1420).

Thereafter, the convergence determination portion 75 stands by until a motor driving command that indicates motor drive in the image reading direction is supplied to the motor control unit from the CPU 11 by the step of S1220 (S1430). When the motor driving command is supplied (S1430: Yes), the variable en_cnt is incremented by 1 at a cycle of a clock signal supplied from the clock generation unit 25 until the variable en_cnt reaches a predetermined value en_cnt_lim (S1440, S1450). Specifically, the convergence determination portion 75 operates synchronously with the clock signal to count up the variable en_cnt.

When the variable en_cnt reaches the value en_cnt_lim (S1440: Yes), the logical value of the stlen signal is set to 0 (S1460). The convergence determination process is ended.

In this manner, the convergence determination portion 75 sets the logical value of the stlen signal to 1 during a period of time from when a process execution command is supplied from the CPU 11 until a predetermined time elapses. The convergence determination portion 75 sets the logical value of the stlen signal to 0 during the other period of time. As noted above, in the present variation, the multifunction apparatus 1 is so constituted as to measure, as an acceleration distance, a distance to where an event that the velocity of the conveyed object is converged into a range between the value u_lim set higher than the target velocity and the value l_lim set lower than the target velocity, from the outside of the range has lastly observed within a predetermined time. In this manner as well, the conveyed object can be set back by a proper distance so that reading by the CCD line sensor 20 may be properly performed at the reading resumption point.

In the above-mentioned embodiment, the CCD line sensor 20 is used as the reading unit. However, any sensor may be used as long as the sensor can read an image. For example, a contact image sensor (CIS) may be used, or a CMOS image sensor may be used. Also in the above-mentioned embodiment, a rotary encoder is used as the encoder EN2. A linear encoder may be used as well.

In the above-mentioned embodiment, the reading motor MT2 and the reading conveyance motor MT4 are constituted as DC motors. However, the reading motor MT2 and the reading conveyance motor MT4 may be constituted as other types of motors such as pulse motors.

In the above-mentioned embodiment, the sum of the acceleration distance and the deceleration distance is set to the setback distance. However, the setback distance may be set as a sum of the acceleration distance, the deceleration distance and a predetermined correction distance. Alternatively, the setback distance may be set as a distance obtained by multiplying a sum of the acceleration distance and the deceleration distance by a predetermined coefficient. The correction distance and the coefficient may be set in accordance with measurement precision of a measuring device (e.g., rotary encoder) and control performance of a motor.

In the above-mentioned embodiment, the position of the CCD line sensor 20 is determined based on one of the A-phase signal and the B-phase signal from the encoder EN2. However, the position of the CCD line sensor 20 may be determined based on both the A-phase signal and the B-phase signal.

In the above-mentioned embodiment, the conveying distance of a document is determined based on one of the A-phase signal and the B-phase signal from the encoder EN4. However, the conveying distance of a document may be determined based on both the A-phase signal and the B-phase signal.

What is claimed is:

1. An image reading apparatus comprising:
    a driving source that generates a driving force;
    a conveying mechanism that transmits the driving force generated by the driving source to a conveyed object so as to convey the conveyed object along a predetermined conveyance path to read image information from a read object;
    a reading control unit including:
    a constant velocity moving control portion that controls a moving velocity of the conveyed object through the conveying mechanism to move the conveyed object at a constant velocity in a conveying direction along the conveyance path, and
    a writing portion that writes, into a memory area, image data of each line on the read object generated by reading the image information when the conveyed object passes a corresponding position on the conveyance path corresponding to a reading start position on the read object where reading of the image information should be started;
    an acceleration distance measuring unit that measures an acceleration distance from a moving start position of the conveyed object to a position where the conveyed object has been shifted to the constant-velocity moving state;
    an interruption determination unit that determines whether or not to interrupt operation of the reading control unit;
    a stop control unit that, when it is determined to interrupt the operation of the reading control unit, stops the operation of the reading control unit, and decelerates the conveyed object through the conveying mechanism until the conveyed object stops moving in the conveyance direction;
    a deceleration distance measuring unit that measures a deceleration distance from a position of the conveyed object when the operation of the reading control unit has been stopped to a position where move of the conveyed object in the conveyance direction has been stopped;
    a setback control unit that moves the conveyed object, which has stopped moving in the conveyance direction, in a direction opposite to the conveyance direction through the conveying mechanism; and
    a setback distance setting unit that sets a setback distance to move the conveyed object by the setback control unit based on the acceleration distance measured by the acceleration distance measuring unit and the deceleration distance measured by the deceleration distance measuring unit, wherein
    the reading control unit reverses the conveyance direction to convey the conveyed object when the conveyed object is moved to an end point in the conveyance direction in the conveying path through the conveying mechanism,
    the setback distance setting unit sets the setback distance based on the acceleration distance measured by the acceleration distance measuring unit and the deceleration distance measured by the deceleration distance measuring unit when the conveyed object is conveyed by the reading control unit in the same direction as the current conveyance direction.

2. The image reading apparatus according to claim 1, wherein
    the setback distance setting unit sets a sum of the acceleration distance measured by the acceleration distance measuring unit and the deceleration distance measured by the deceleration distance measuring unit as the setback distance.

3. The image reading apparatus according to claim 1, wherein
    the setback distance setting unit sets a sum of the acceleration distance measured by the acceleration distance measuring unit, the deceleration distance measured by the deceleration distance measuring unit, and a predetermined correction distance as the setback distance.

4. The image reading apparatus according to claim 1, further comprising
    a restart determination unit that determines whether to restart operation of the reading control unit when the operation of the reading control unit is interrupted,
    wherein the reading control unit, when it is determined to restart the operation of the reading control unit by the restart determination unit, moves the conveyed object moved by the setback control unit in the conveyance direction at a constant velocity, and writes the image data of each line into the memory area when the conveyed object passes the corresponding position.

5. The image reading apparatus according to claim 1, wherein
    the interruption determination unit determines whether to interrupt operation of the reading control unit based on free space on the memory area.

6. The image reading apparatus according to claim 1, wherein
    the acceleration distance measuring unit measures the acceleration distance each time the conveyed object is conveyed by the reading control unit.

7. The image reading apparatus according to claim 1, wherein
    the deceleration distance measuring unit measures the deceleration distance each time operation of the reading control unit is stopped and the conveyed object is decelerated by the stop control unit.

8. The image reading apparatus according to claim 1, wherein
    the setback distance setting unit sets the setback distance each time the conveyed object is conveyed by the setback control unit, based on up-to-date measurement results obtained from the acceleration distance measuring unit and the deceleration distance measuring unit.

9. The image reading apparatus according to claim 1, wherein
the conveyed object is a reading unit that reads the image information from the read object.

10. The image reading apparatus according to claim 1, further comprising
a counter that makes counting in accordance with move of the conveyed object, wherein
the acceleration distance measuring unit calculates a difference between a count value in the counter when the conveyed object has started to move and the count value in the counter when the conveyed object has shifted into a constant-velocity moving state to measure the acceleration distance based on a calculation result.

11. The image reading apparatus according to claim 1, wherein
a counter that makes counting in accordance with move of the conveyed object, wherein
the deceleration distance measuring unit calculates a difference between a count value in the counter when operation of the reading control unit has been stopped and the count value in the counter when move of the conveyed object in the conveying direction has stopped to measure the deceleration distance based on a calculation result.

12. The image reading apparatus according to claim 1, wherein
the conveyed object is a read object.

13. The image reading apparatus according to claim 1, wherein
the driving source is a motor.

14. The image reading apparatus according to claim 13, wherein
the motor is a direct current motor.

15. An image reading apparatus comprising:
a driving source that generates a driving force;
a conveying mechanism that transmits the driving force generated by the driving source to a conveyed object so as to convey the conveyed object along a predetermined conveyance path to read image information from a read object;
a reading control unit including:
a constant velocity moving control portion that controls a moving velocity of the conveyed object through the conveying mechanism to move the conveyed object at a constant velocity in a conveying direction along the conveyance path, and
a writing portion that writes, into a memory area, image data of each line on the read object generated by reading the image information when the conveyed object passes a corresponding position on the conveyance path corresponding to a reading start position on the read object where reading of the image information should be started;
an acceleration distance measuring unit that measures an acceleration distance from a moving start position of the conveyed object to a position where the conveyed object has been shifted to the constant-velocity moving state;
an interruption determination unit that determines whether or not to interrupt operation of the reading control unit;
a stop control unit that, when it is determined to interrupt the operation of the reading control unit, stops the operation of the reading control unit, and decelerates the conveyed object through the conveying mechanism until the conveyed object stops moving in the conveyance direction;
a deceleration distance measuring unit that measures a deceleration distance from a position of the conveyed object when the operation of the reading control unit has been stopped to a position where move of the conveyed object in the conveyance direction has been stopped;
a setback control unit that moves the conveyed object, which has stopped moving in the conveyance direction, in a direction opposite to the conveyance direction through the conveying mechanism; and
a setback distance setting unit that sets a setback distance to move the conveyed object by the setback control unit based on the acceleration distance measured by the acceleration distance measuring unit and the deceleration distance measured by the deceleration distance measuring unit, wherein
a first determination velocity is set higher than a target velocity at constant-velocity control by the reading control unit,
a second determination velocity is set lower than the target velocity,
the acceleration distance measuring unit outputs, as a measurement result, a distance starting from the moving start position to a position where an event that a velocity of the conveyed object is converged into a range between the first determination velocity and the second determination velocity from outside the range has lastly occurred in a predetermined period of time after start of moving of the conveyed object.

* * * * *